US011132476B2

(12) United States Patent
Colas et al.

(10) Patent No.: US 11,132,476 B2
(45) Date of Patent: Sep. 28, 2021

(54) AUTOMATIC AIRCRAFT DESIGN OPTIMIZATION BASED ON JOINT AERODYNAMIC, STRUCTURAL, AND ENERGY PERFORMANCE

(71) Applicant: Facebook, Inc., Menlo Park, CA (US)

(72) Inventors: Dorian Frederic Marie Colas, Seattle, WA (US); Vishvas Samuel Suryakumar, Redwood City, CA (US); Nicholas Roberts, Seattle, WA (US)

(73) Assignee: FACEBOOK, INC., Menlo Park, CA (US)

( * ) Notice: Subject to any disclaimer, the term of this patent is extended or adjusted under 35 U.S.C. 154(b) by 524 days.

(21) Appl. No.: 15/840,486

(22) Filed: Dec. 13, 2017

(65) Prior Publication Data

US 2019/0179997 A1   Jun. 13, 2019

(51) Int. Cl.
*G06F 30/15*       (2020.01)
*G06F 111/06*    (2020.01)

(52) U.S. Cl.
CPC .......... *G06F 30/15* (2020.01); *G06F 2111/06* (2020.01)

(58) Field of Classification Search
CPC .............................. G06F 30/15; G06F 2111/06
USPC ............................................................. 703/8
See application file for complete search history.

(56) References Cited

U.S. PATENT DOCUMENTS

| 7,236,914 B1 | 6/2007 | Zyskowski |
| 8,280,663 B2 | 10/2012 | Artiles Albelda et al. |
| 9,751,614 B1 | 9/2017 | Nguyen et al. |
| 2005/0121555 A1 | 6/2005 | Morgenstern et al. |
| 2011/0172795 A1 | 7/2011 | Hansen et al. |
| 2013/0124177 A1 | 5/2013 | Falangas |
| 2014/0372093 A1 | 12/2014 | Takami et al. |

FOREIGN PATENT DOCUMENTS

| WO | WO 2016/093905 A1 | 6/2016 |
| WO | WO 2016/141101 A1 | 9/2016 |

OTHER PUBLICATIONS

Leutenegger_2011 (Solar Airplan Conceptual Design and Performance Estimation: What Size to Choose and What Endurance to Expect J Intell Robot Syst (2011) 61:545-561) (Year: 2011).*

(Continued)

*Primary Examiner* — Brian S Cook
(74) *Attorney, Agent, or Firm* — Keller Jolley Preece

(57) ABSTRACT

Systems, methods, and non-transitory computer-readable media are disclosed for automatically generating aircraft models by modifying quantitative design variables based on joint analysis of aerodynamic, structural, and/or energy performance. For example, in one or more embodiments, disclosed systems iteratively modify ailerons and a propulsion system based on performance criteria until a balancing metric converges. The disclosed systems then determine performance metrics corresponding to the aircraft model with the modified ailerons and propulsion system, such as stresses and deflections under performance load, a measure of aeroelastic stability, and a battery performance metric. The disclosed systems can then modify design variables based on the determined performance metrics to explore the design space and generate a new aircraft model.

20 Claims, 15 Drawing Sheets

(56) References Cited

OTHER PUBLICATIONS

Blair_2012 (Design of a Micro Class Aircraft for the 2012 SAE Aero Design East Competition, Worcester Polytechnic Institute, 2012 DJO 1201) (Year: 2012).*
Sadraey_2012 (Aileron Design Chapter 12 Design of Control Surfaces, Aircraft Design: A Systems Engineering Approach Sep. 2012 Wiley Publications). (Year: 2012).*
Erdinic_2007 (Aeroelastic stability prediction using flutter flight test data, 2007). (Year: 2007).*
Costa_1994 (Design and Construction of a Remote Piloted Flying Wing, DJO-93AA NASA/USRA Advanced Aeronautics Design Program 1994). (Year: 1994).*
Roshanian_2017 (Multi-objective Multidisciplinary Design Optimization of a General Aviation Aircraft, Modares Mechanical Engineering, vol. 17, No. 2, pp. 199-210, Feb. 7, 2017). (Year: 2017).*
Diaz Puebla, Alejandro and Raghu Chaitanya Munjulury. "Sizing of Actuators for Flight Control System and Flaps Integration in RAPID," Aerospace Technology Congress. Solna, SE: Oct. 2016 (Year: 2016).*
Extended European Search Report as received European Application 18180866.8 dated Feb. 5, 2019.
James Blair et al: "Design of a Micro Class Aircraft for the 2012 SAE Aero Design East Competition", Apr. 23, 2012 (Apr. 23, 2012), XP055547727, Retrieved from the Internet: URL:https://web.wpi.edu/Pubs/E-project/Available/E-project-042312-201453/unrestricted/MQP_Report.pdf [retrieved on Jan. 25, 2019].
Stefan Leutenegger et al: "Solar Airplane Conceptual Design and Performance Estimation; What Size to Choose and What Endurance to Expect", Journal of Intelligent and Robotic Systems ; Theory and Applications—(Incorporating Mechatronic Systems Engineering), Kluwer Academic Publishers, DO, vol. 61, No. 1-4, Nov. 12, 2010 (Nov. 12, 2010), pp. 545-561, XP019855713, ISSN: 1573-0409, DOI: 10.1007/ S10846-010-9484-X.
International Search Report & Written Opinion as received in PCT/US2017/066490 dated Sep. 11, 2018.
International Preliminary Report on Patentability as received in PCT/US2017/066490 dated Jun. 25, 2020.

\* cited by examiner

AUTOMATIC AIRCRAFT DESIGN OPTIMIZATION BASED ON JOINT AERODYNAMIC, STRUCTURAL, AND ENERGY PERFORMANCE

BACKGROUND

Recent years have seen significant development in long-endurance aircraft design. For example, developers have recently created high-altitude, long-endurance aircraft to provide improved digital communication capabilities. To illustrate, developers have generated solar-powered, high-altitude, long-endurance aircraft that provide internet connectivity in regions without other viable means of internet access. Solar-powered aircraft offer the capability of staying airborne with the ability to station-keep under gusts for several months at a time (or longer). Stringent operational constraints for such implementations, however, place demanding requirements on every aircraft subsystem. For instance, the need for long endurance requires superior aerodynamic performance (high lift to drag ratios) at low Reynolds numbers enabled by efficient light-weight structures. These high-performance requirements often lead to flexible, high-aspect ratio wings that are susceptible to aeroelastic instabilities such as flutter, low controllability, and the adverse impact of large deformations on flight handling qualities.

As aircraft design moves into this challenging new frontier, the shortcomings of conventional aircraft design systems have become increasingly apparent. Indeed, the inflexibility, computational requirements, and/or simplified design models utilized by conventional aircraft design systems make new aircraft designs difficult and expensive to generate. For example, some conventional aircraft design systems utilize simplified models for general aircraft component layout design that fail to consider various aspects in high altitude solar aircraft design. Although such systems provide general tools for preliminary design, they fail to provide accurate analysis of the various interactive disciplines that impact aircraft functionality. For instance, such systems generally fail to capture aeroelastic interactions and stability, which are pivotal in the design of high-altitude long endurance aircraft.

Other conventional aircraft design systems utilize empirical data to generate aircraft designs and then utilize individual, high-fidelity, computationally intensive tools to test various components of the aircraft. For example, after designing an aircraft based on empirical data (e.g., design charts, historical designs, or similar data), conventional aircraft design systems utilize finite element analysis to determine structural strength of a wing. Although tools are useful in testing performance characteristics of individual components of an existing design, they are computationally intensive and impede flexibility in aircraft design. Indeed, individual tools for analyzing individual components of an aircraft can easily exhaust the computing resources of many conventional computing devices. Moreover, such tools generally focus on individual components, rather than a flexible design approach for the aircraft as a whole. Indeed, such tools generally require detailed aircraft models (e.g., final or near-final models where most significant design variables have already resolved) to generate accurate results. Accordingly, such tools are generally only useful during detailed-design stages, where introducing larger system changes may be prohibitively expensive. This approach imposes a significant amount of rigidity into the design process and fails to capture efficiencies or improvements that may be available from these larger system changes.

These and other problems exist with regard to conventional aircraft design systems.

BRIEF SUMMARY

One or more embodiments described herein provide benefits and/or solve one or more of the foregoing (or other) problems in the art with systems, methods, and non-transitory computer readable media for automatically generating aircraft models by optimizing design variables based on joint analysis of aerodynamic, structural, and/or energy performance. In particular, the disclosed systems utilize a lightweight, multi-disciplinary optimization framework to generate aircraft models (for a variety of different aircraft, including single-boom, multi-boom, and flying-wing) with reduced overall aircraft weight and improved energy performance within performance constraints. For example, the disclosed systems can determine or receive initial design variables of the aircraft model; iteratively (and jointly) design balanced aircraft subsystems based on the initial design variables; analyze the aerodynamic, structural, and energy performance of the aircraft model; and then utilize an optimization algorithm to modify the design variables based on the determined aerodynamic, structural, and energy performance. In this manner, the disclosed systems can efficiently consider (e.g., at the conceptual design phase) a variety of competing demands based on lightweight modeling of first-order physics to generate an improved aircraft model.

To illustrate, in one or more embodiments, the disclosed systems identify an input set of digital design variables of an input aircraft model. The disclosed systems can then analyze structural performance, aerodynamic performance, and battery performance of the design variables. For example, based on the input set of digital design variables, the disclosed systems can iteratively modify ailerons and a propulsion system of the input aircraft model based on performance criteria until a balancing metric of the input aircraft model converges. Moreover, the disclosed systems can determine stresses and deflections of the input aircraft model (with the modified ailerons and the modified propulsion system) under performance loads; determine a measure of aeroelastic stability of the input aircraft model within a flight envelope with respect to an oscillation instability mode; and determine a battery performance metric of the aircraft model in relation to a test mission. The disclosed systems can then generate a modified aircraft model by modifying the set of design variables of the aircraft model based on the determined stresses and deflections of the aircraft model, based on the determined aeroelastic stability, and based on the determined battery performance metric of the aircraft model.

The following description sets forth additional features and advantages of one or more embodiments of the disclosed systems, computer media, and methods. In some cases, such features and advantages will be obvious to a skilled artisan from the description or may be learned by the practice of the disclosed embodiments.

BRIEF DESCRIPTION OF THE DRAWINGS

The detailed description refers to the accompanying drawings, in which.

DETAILED DESCRIPTION

Figure 1A:
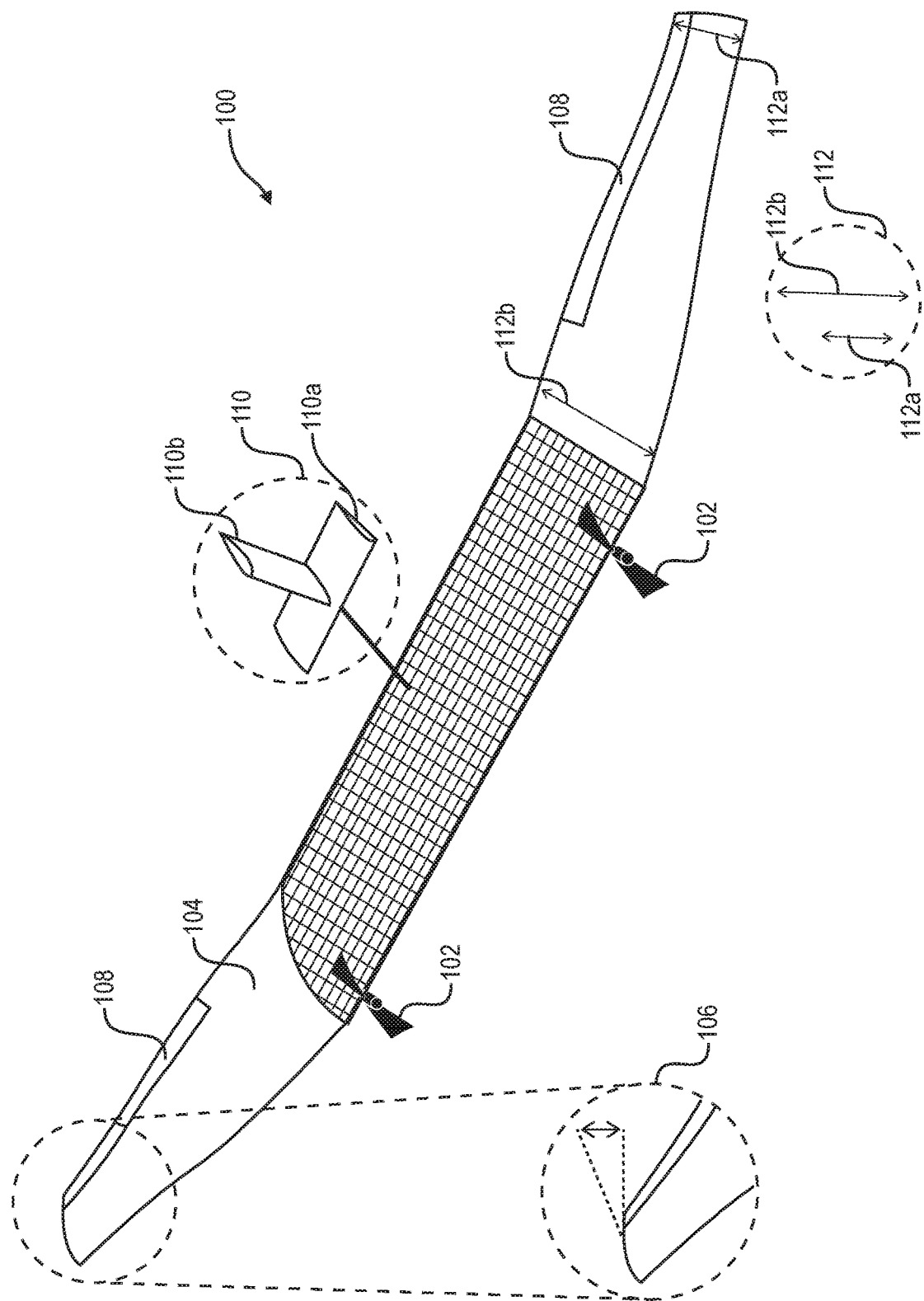
FIGS. 1A-1B illustrate boom aircraft models in accordance with one or more embodiments.

One or more embodiments of the present disclosure include a multi-disciplinary aircraft design system that generates aircraft models by optimizing design variables based on joint analysis of aerodynamic, structural, and energy performance. In particular, the multi-disciplinary aircraft design system can integrate modeling of aerodynamic performance at low turbulence levels and low Reynolds numbers, aerodynamic loads, and resulting stresses during design to generate a final aircraft model. For instance, in one or more embodiments, the multi-disciplinary aircraft design system utilizes initial design variables to iteratively (and jointly) modify balanced aircraft subsystems and then determine aerodynamic, structural, and energy performance measures. In one or more embodiments, the multi-disciplinary aircraft design system then applies an optimization algorithm to modify the initial design variables (and potentially other design variables) based on the determined aerodynamic, structural, and energy performance measures. In this manner, the multi-disciplinary aircraft design system can generate a modified aircraft model that reduces overall weight (and/or cost) while balancing trade-offs in competing demands for structural stability, aerodynamic performance, and energy utilization.

To illustrate, in one or more embodiments, the multi-disciplinary aircraft design system identifies an input set of digital design variables of an input aircraft model. The multi-disciplinary aircraft design system can then analyze structural performance, aerodynamic performance, and battery performance of the input aircraft model with the input set of design variables. For example, the multi-disciplinary aircraft design system can iteratively modify ailerons, an empennage (or winglets), and/or a propulsion system of the aircraft model based on performance criteria until a balancing metric of the input aircraft model converges. Moreover, the multi-disciplinary aircraft design system can determine stresses and deflections of the input aircraft model under performance loads; determine a measure of aeroelastic stability of the input aircraft model with respect to an oscillation instability mode; and determine a battery performance metric of the input aircraft model in relation to a test mission. The disclosed systems can then modify the input set of digital design variables of the input aircraft model based on the determined stresses and deflections of the aircraft model, the determined aeroelastic stability, and the determined battery performance metric of the input aircraft model.

As just mentioned, in one or more embodiments, the multi-disciplinary aircraft design system iteratively modifies various subsystems of an aircraft model. In particular, in one or more embodiments, the multi-disciplinary aircraft design system iteratively modifies subsystems of the aircraft model to balance the aircraft and satisfy performance criteria. For example, in one or more embodiments, the multi-disciplinary aircraft design system iteratively (and jointly) modifies ailerons, an empennage (or winglets), wing location (or battery location), and/or a propulsion system. Indeed, these subsystems (or other subsystems, depending on the embodiment) of an aircraft model are generally co-dependent. For example, resizing the empennage changes overall weight and center of gravity as well as aerodynamic characteristics of the aircraft model, which in turn, impacts design of the ailerons, and the propulsion system.

Accordingly, in one or more embodiments, the multi-disciplinary aircraft design system iteratively modifies these subsystems, jointly as part of an inner loop, until convergence. In particular, the multi-disciplinary aircraft design system can analyze design variables to determine weight of the aircraft structure, aircraft stiffness, and weight. The multi-disciplinary aircraft design system can modify the empennage and wing position to balance the aircraft (based on longitudinal stability criteria), and then capture aerodynamic performance of the aircraft to modify the propulsion system (based on performance criteria for the propulsion system) and/or ailerons (based on performance criteria for the ailerons). Moreover, the multi-disciplinary aircraft design system can iterate until convergence. For example, in one or more embodiments, the multi-disciplinary aircraft design system iteratively modifies these subsystems until a balancing metric (e.g., the center of gravity) converges to within a tolerance.

As discussed above, with modified subsystems that satisfy performance criteria, the multi-disciplinary aircraft design system can further determine a variety of performance metrics for the aircraft model (i.e., performance metrics utilized in an outer optimization loop for the design variables). For example, the multi-disciplinary aircraft design system can apply a performance load to the aircraft model and determine stresses and/or deflections in the aircraft model resulting from the performance load. Similarly, the multi-disciplinary aircraft design system can determine a measure of longitudinal stability (e.g., static margin) of the aircraft model. Further, the multi-disciplinary aircraft design system can determine oscillation instability modes of the aircraft model throughout the flight envelope and determine measures of aeroelastic stability (e.g., damping) of the aircraft model. Further, the multi-disciplinary aircraft design system can simulate integrated performance of the aircraft model on a mission test over time and determine a battery performance metric for the mission test (e.g., an amount of battery or fuel remaining at the end of a mission or portion of a mission).

Upon determining these performance metrics, the multi-disciplinary aircraft design system can then utilize the performance metrics to modify (e.g., optimize) design variables. For example, the multi-disciplinary aircraft design system can utilize an optimization algorithm to modify design variables to obtain one or more objectives subject to one or more constraints. To illustrate, the multi-disciplinary aircraft design system can utilize an optimization algorithm with objectives to minimize weight and/or cost of the aircraft model. Moreover, the multi-disciplinary aircraft design system can utilize constraints that include aeroelastic stability constraints, stress constraints, deflection constraints, battery performance metric constraints, and/or longitudinal stability constraints. The multi-disciplinary aircraft design system can repeatedly perform these steps (e.g., iteratively modifying subsystems, determining performance metrics, and optimizing design variables) to generate a new, improved aircraft model. In this manner, the multi-disciplinary aircraft design system can utilize the optimization algorithm to explore the design space and optimize objectives subject to constraints guided by aerodynamic, structural, and energy performance metrics.

The multi-disciplinary aircraft design system provides a variety of advantages over conventional aircraft model systems. For example, the multi-disciplinary aircraft design system can generate aircraft models based on accurate physics models. Indeed, as just mentioned, in order to quickly and accurately explore the design space, the disclosed systems can employ first-order physics models that retain sufficient engineering fidelity to capture the dominant interactions and trends amount various disciplines (e.g., without delving into second or third-order physics effects that demand excessive computational power). For instance, as outlined in greater detail below, the multi-disciplinary aircraft design system can consider coupled interactions between aerodynamic, structure, and energy performance to accurately model aircraft performance in generating efficient aircraft models. For example, the multi-disciplinary aircraft design system can model low Reynolds number aerodynamics, structural detail (composites) and integrated mission performance (with solar energy utilization) at a fidelity-level to design high-aspect ratio aircraft robust to aeroelastic instabilities. Accordingly, the multi-disciplinary aircraft design system can rapidly downselect potential design configurations, while capturing sufficient engineering fidelity to generate realistic designs that enable shorter engineering and development cycles.

In addition to accurately modeling performance of aircraft designs, the multi-disciplinary aircraft design system can also efficiently generate aircraft models to avoid overtaxing computing systems. Indeed, as outlined in greater detail below, the multi-disciplinary aircraft design system utilizes a computationally-efficient framework that interconnects various light-weight tools of adequate fidelity to capture trends and interactions. The multi-disciplinary aircraft design system can also implement a sizing and data flow logic so that only a small combination of design variables is utilized to adequately parse the design space. Accordingly, the multi-disciplinary aircraft design system can capture low Reynolds number aerodynamics, composite structures, integrated vehicle performance (including solar energy utilization) and their interactions while improving computational efficiency.

Furthermore, the multi-disciplinary aircraft design system can also improve flexibility of aircraft design by allowing for large-scale variations of design variables based on accurate, efficient analysis of changes to aerodynamics, structure, and energy utilization. Indeed, the multi-disciplinary aircraft design system can be easily implemented at the conceptual stage where candidate designs need to be quickly evaluated in order to rapidly explore the design space. Thus, the multi-disciplinary aircraft design system can simultaneously consider and implement large-scale modifications to various design variables (e.g., wing structure, taper ratios, or pod span location), to generate an improved aircraft model that satisfies performance constraints. Moreover, by flexibly modifying a variety of aircraft components while considering multiple dimensions of aircraft performance, the multi-disciplinary aircraft design system can identify additional efficiencies and improvements in aircraft models.

In addition, as outlined in greater detail below, the multi-disciplinary aircraft design system can also flexibly generate aircraft models in relation to a variety of different aircraft types. For example, the multi-disciplinary aircraft design system can generate a boom aircraft model (e.g., a single-boom or multi-boom aircraft model) or a flying-wing aircraft model. Moreover, the multi-disciplinary aircraft design system can generate aircraft models for a variety of different wing configurations and/or cross sections. Accordingly, the multi-disciplinary aircraft design system is not limited to a particular type of aircraft, but has the flexibility to generate more models for various aircraft types.

As illustrated by the foregoing discussion, the present disclosure utilizes a variety of terms to describe features and advantages of the multi-disciplinary aircraft design system. Additional detail is now provided regarding the meaning of such terms.

For example, as used herein, the term "aircraft model" refers to a digital representation of an aircraft. In particular, the term aircraft model includes a digital representation of components of an aircraft such as a wing, a propulsion system, an empennage, or ailerons. An aircraft model can also include a variety of design variables. As mentioned above, the multi-disciplinary aircraft design system can generate an aircraft model for a variety of different types of aircraft, including a boom aircraft model (e.g., a single-boom aircraft model that represents an aircraft with one longitudinal boom or a multi-boom aircraft model that includes a representation of an aircraft with multiple longitudinal booms) or a flying-wing aircraft model (e.g., an aircraft model for a tailless, fixed-wing aircraft with no definite fuselage).

As just mentioned, the aircraft model can include a variety of different components, including ailerons, a propulsion system (and battery), an empennage, and/or winglets. As used herein the term "aileron" refers to a hinged flight control surface along a wing. In particular, ailerons include hinged surfaces along the tailing edge of a wing utilized to control an aircraft in roll. Similarly, as used herein the term "propulsion system" refers to one or more elements utilized to generate thrust for an aircraft. In particular, a propulsion system includes one or more elements utilized to generate a forward action of an aircraft in flight. For example, a propulsion system can include a motor (e.g., battery-powered or fuel-powered) operably connected to propellers. A propulsion system can also include a turbine (e.g., jet) engine, ramjet, or rocket. A propulsion system can also include a battery utilized to power the propulsion system (and/or power other systems in the aircraft that rely on electrical power). In one or more embodiments, the propulsion system is solar powered. In particular, the propulsion system includes photovoltaic cells that convert solar energy into electric energy to supply the motors and payload. Excess energy captured during daylight is stored in a fuel cell (e.g., battery). During the night, the fuel cell provides energy to the motors and payload.

As used herein, the term "empennage" refers to a tail structure of an aircraft. In particular, an empennage includes a tail assembly at the rear of an aircraft that provides stability during flight. For instance, an empennage can include a horizontal stabilizing surface (e.g., a tailplane with elevator) and a vertical stabilizing surface (e.g., fin with a rudder) that stabilize the aircraft during flight. The multi-disciplinary aircraft design system can modify a horizontal tail area (e.g., area of the tailplane and/or elevator) of the horizontal stabilizing surface and/or a vertical tail area (e.g., area of the fin and/or rudder) of the vertical stabilizing surface.

As used herein, the term "winglet" refers to a component on a tip of wing. In particular, a winglet includes a device affixed to the tip of a wing that improve efficiency of the aircraft (e.g., provides increased effective aspect ratio of a wing to increase lift generated at the wingtip and reduce lift-induced drag caused by wingtip vortices).

As used herein, the term "quantitative design variables" (or "digital design variables" or "design variables") refers to an element, feature, or factor of an aircraft model. In particular, "quantitative design variables" includes elements, features, or factors of an aircraft model that the multi-disciplinary aircraft design system can modify, vary, or change (e.g., change utilizing an optimization algorithm). For example, in one or more embodiments, design variables include taper ratio (e.g., ratio of a tip chord of a wing to a root chord of the wing), wing twist (e.g., geometric or aerodynamic twist of the wing such that, for example, the outboard section of the wing does not stall first), maximum gross take-off weight, cruise lift coefficient, wing structure (e.g., number of plies in the wing), pod span location (e.g., location of an engine or motor pod along the wing span of the aircraft), or wing sweep (e.g., angle backward or forward of a wing from the root). Design variables can also include ailerons (e.g., aileron size), propulsion system (e.g., propulsion system size including battery size), or empennage (e.g., empennage size).

As used herein, the term "performance criteria" refers to a standard reflecting an ability to accomplish an action, task, or function. In particular, performance criteria include a standard reflecting the ability of an aircraft model (or a system of an aircraft model) to accomplish a flight action, task, or function. For example, performance criteria for ailerons can include a steady-roll state (e.g., ability to achieve the steady-roll state utilizing a particular aileron size). Similarly, performance criteria can include a yaw performance case (e.g., ability to satisfy a historical recorded adverse yaw case, a motor out case, or a landing in side-slip case utilizing a particular empennage size). In addition, performance criteria can include longitudinal stability criteria (e.g., pitch trim condition or tail volume coefficient criteria to be met based on a particular empennage size, winglet size, wing location, and/or battery location). Moreover, performance criteria can include propulsion criteria (e.g., maximum power and torque criteria at take-off and/or maximum altitude climb).

As used herein, the term "balancing metric" refers to a measure of weight of an aircraft. In particular, a balancing metric includes a measure of weight that reflects that iterative modifications to one or more subsystems of an aircraft model have converged. For example, a balancing metric includes a center of gravity of an aircraft model and/or a battery weight of an aircraft model.

As used herein, the term "optimization algorithm" refers to a computer model that modifies design variables to accomplish an objective. In particular, an optimization algorithm includes a computer model that modifies design variables of an aircraft model to accomplish one or more objectives within one or more constraints. For example, in one or more embodiments, the multi-disciplinary aircraft design system utilizes an optimization algorithm that modifies design variables to explore a design space in an effort to maximize a battery performance metric while minimizing aircraft model weight. Moreover, in one or more embodiments multi-disciplinary aircraft design system utilizes an optimization algorithm that applies constraints such as an aeroelastic stability constraint (e.g., a constraint on flutter or a measure of damping), a structural constraint (e.g., a constraint on the amount of stress and/or deflection), a longitudinal stability constraint (e.g., a constraint on static margin or a pitching moment coefficient at a particular angle of attack), or an energy performance constraint (e.g., a minimum amount of battery remaining after performance of a test mission).

In determining whether aircraft models satisfy various constraints, the multi-disciplinary aircraft design system can determine one or more performance metrics for an aircraft model. For example, performance metrics can include stresses and/or deflections under a performance load, a measure of aeroelastic stability through a flight envelope (e.g., for one or more oscillation instability modes corresponding to the aircraft model), or a battery performance metric.

As used herein, the term "performance load" refers to an external force, pressure, or torque applied to an aircraft. In particular, a performance load includes a force, pressure, or torque applied to an aircraft model that approximates an action, task or function of an aircraft in flight. For example, a performance load includes an upward force or pressure applied to a wing of an aircraft model in flight.

As used herein, the term "measure of aeroelastic stability" refers to a metric of interactions between the inertial, elastic, and/or aerodynamic forces that occur when an object is exposed to fluid flow. In particular, a measure of aeroelastic stability includes a metric of interactions between inertial, elastic, and aerodynamic forces when an aircraft is in flight and corresponding to an oscillation instability mode of the aircraft model. For example, a measure of aeroelastic stability can include an amount of flutter of an aircraft model at a particular velocity and/or altitude for a particular oscillation instability mode. Similarly, a measure of aeroelastic stability can include an amount of damping of an aircraft model in relation to an oscillation instability mode.

As used herein, the term "oscillation instability mode" refers to a wave state of excitation of an aircraft model. In particular, the term oscillation instability mode includes a wave state of excitation of an aircraft model in which components of the aircraft model are affected sinusoidally under a fixed frequency. When frequencies caused by flight correspond to an oscillation instability mode, an aircraft can oscillate, flutter, and/or fail. For example, in an aircraft model with poor aeroelastic stability, a frequency encountered within a flight envelope of the aircraft model corresponding to an oscillation instability mode for the aircraft can cause the aircraft to flutter and break apart. In an aircraft model with good aeroelastic stability, for frequencies encountered within a flight envelope, the aircraft model will dampen oscillations or flutter and the aircraft will remain stable for one or more oscillation instability modes of the aircraft model. The multi-disciplinary aircraft design system can account for a variety of oscillation instability modes, such as a short-period mode or a structural bending mode.

In one or more embodiments, the multi-disciplinary aircraft design system tests performance metrics such as aeroelastic stability throughout a flight envelope. As used herein, the term "flight envelope" refers to capabilities of an aircraft model. In particular, a flight envelope includes capabilities of an aircraft model expressed in terms of velocity and load factor. For example, a flight envelope can be derived from a V-n diagram where capabilities of an aircraft are delineated (e.g., within a box or envelope) as a function of velocity (V) and load factor (n) (and/or altitude). Thus, for example, the multi-disciplinary aircraft design system can test aeroelastic stability for one or more oscillation instability modes of an aircraft model at a plurality of different velocities and/or loads throughout the flight envelope.

In one or more embodiments, the multi-disciplinary aircraft design system further determines a measure of longitudinal stability of an aircraft. As used herein, the term "measure of longitudinal stability" refers to a metric of stability of an aircraft in the pitching plane under a flight condition. In particular, a measure of longitudinal stability can include a metric of the moment equilibrium condition (e.g., pitch trim) of a design aircraft. In addition, a measure of longitudinal stability includes a metric reflecting an ability of an aircraft model to return to a longitudinal alignment in a steady flight condition after being disturbed (e.g., static margin). A measure of longitudinal stability can include a measure of static longitudinal stability or a measure of dynamic longitudinal stability (e.g., a metric reflecting an ability of an aircraft model to return to a longitudinal alignment over time). As mentioned, the measure of longitudinal stability can include a variety of different metrics, including pitch trim, static margin, tail volume coefficient, or a coefficient of pitching moment (e.g., a coefficient of pitching moment at an equilibrium condition or at one or more angles of attack).

As mentioned above, the multi-disciplinary aircraft design system can also determine a battery performance metric. As used herein, the term "battery performance metric" refers to a measure of energy corresponding to use of a battery. In particular, a battery performance metric includes a measure of energy corresponding to a use of a battery in an aircraft model during a test mission (e.g., a pre-determined flight mission for testing the battery performance metric). For example, the battery performance metric includes an amount of energy remaining in a solar-powered battery of an aircraft model upon modeling the aircraft model in a test mission comprising a flight spanning the winter solstice.

As discussed above, the multi-disciplinary aircraft design system can also utilize a variety of different lightweight algorithms for modeling first order physics of an aircraft model. For example, the multi-disciplinary aircraft design system can utilize an airfoil performance algorithm, a structural analysis algorithm, and/or an aircraft flight modeling algorithm. As used herein, an "airfoil performance algorithm" refers to an algorithm for design or analysis of airfoils in an aircraft model. In particular, an airfoil performance algorithm includes an algorithm that determines lift and/or drag characteristics of an airfoil (e.g., a two-dimensional cross-section of an airfoil). For example, an airfoil performance algorithm includes one or more versions of XFOIL: Subsonic Airfoil Development System (originally developed by Massachusetts Institute of Technology).

As used herein, a "structural analysis algorithm" refers to a computer model for determining structural properties of an aircraft model. In particular, a structural analysis algorithm includes a computer model for determining structural properties, deformations, stresses, and strains of an aircraft model (e.g., a wing of an aircraft model). For example, a structural analysis algorithm includes one or more versions of Co-Blade: Software for Analysis and Design of Composite Blades.

Further, as used herein, an "aircraft flight modeling algorithm" refers to a computer model algorithm for determining aerodynamic, structural, and control-response of an aircraft. In particular, an aircraft flight modeling algorithm includes an algorithm for modeling aerodynamic, structural, and control-response of an aircraft in flight given one or more performance loads, circumstances, or missions. For example, an aircraft flight modeling algorithm includes one or more versions of ASWING: Configuration Development System For Flexible Aircraft (originally developed by Massachusetts Institute of Technology).

Figure 1B:
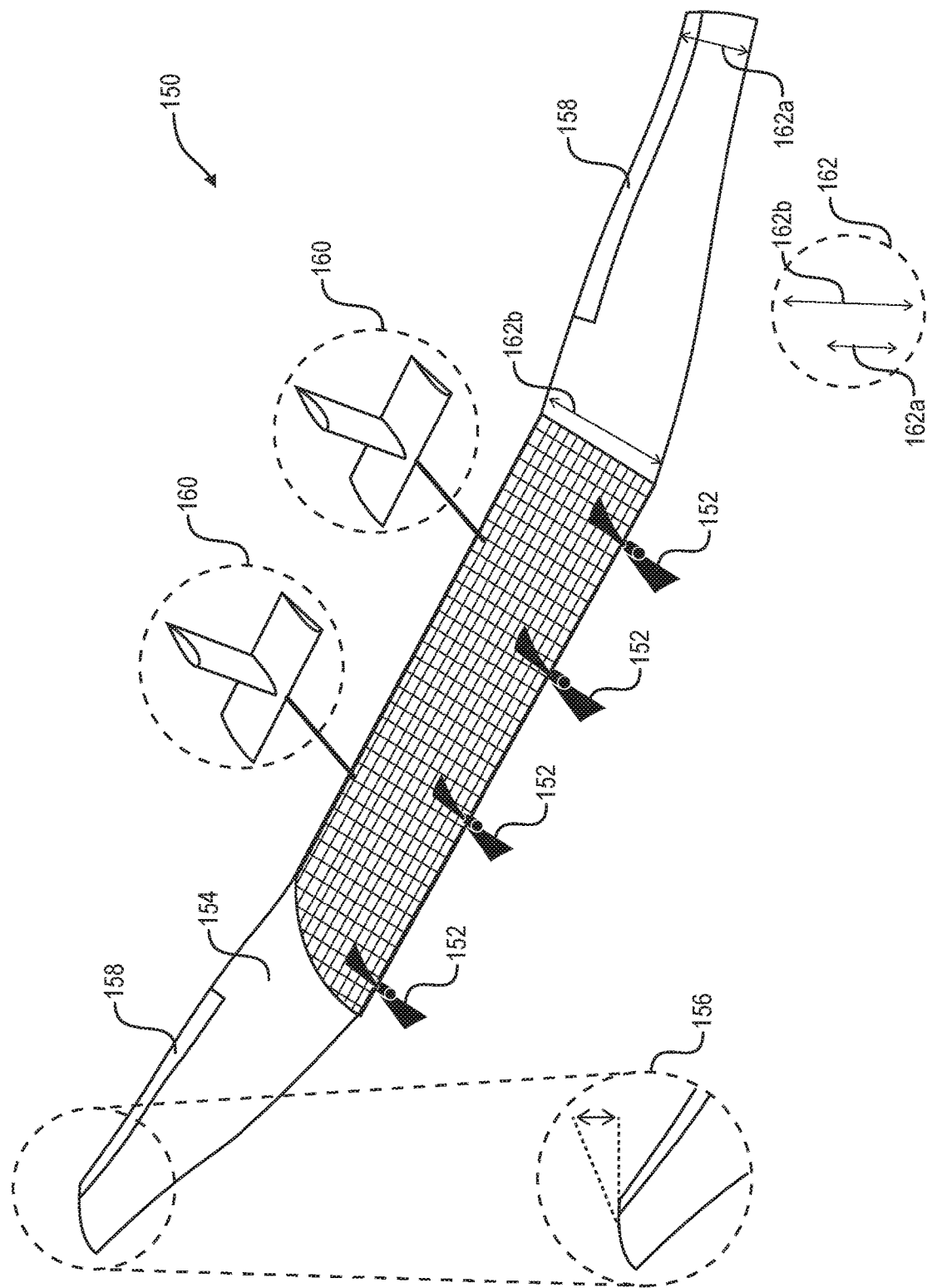

Turning now to FIGS. 1A-1B, additional detail will be provided regarding generating aircraft models in accordance with one or more embodiments. FIGS. 1A-1B illustrate boom aircraft models generated by the multi-disciplinary aircraft design system in accordance with one or more embodiments. In particular, FIG. 1A shows a single-boom aircraft model 100 and FIG. 1B illustrates a multi-boom aircraft model 150 (i.e., an aircraft model with two booms).

As described above, the multi-disciplinary aircraft design system can generate an aircraft model utilizing a variety of design variables. For example, as shown in FIG. 1A, the multi-disciplinary aircraft model generates the single-boom aircraft model 100 with a propulsion system 102. As illustrated in FIG. 1A, the propulsion system 102 includes two propellers with a corresponding motor and battery to power the propellers. The multi-disciplinary aircraft design system can modify the propulsion system 102, including the size of the propellers, the size of the motors, and/or the size of the battery utilized to power the propulsion system 102. Although illustrated as a propulsion system that utilizes propellers, the multi-disciplinary aircraft design system can also utilize a variety of different propulsion system types as described above.

Moreover, as shown in FIG. 1A, the single-boom aircraft model 100 also includes a wing structure 104. In particular, the wing structure 104 includes a particular number of plies in a particular arrangement. In one or more embodiments, the multi-disciplinary aircraft design system generates the wing structure 104 as a box-spar with sandwich panels consisting of unidirectional, plain-weave and core plies to provide bending (in-plane and out-of-plane) and torsional stiffness. The multi-disciplinary aircraft design system can increase/decrease the number of plies as well as the geometry of the spar-box. The multi-disciplinary aircraft design system can utilize a variety of different wing structure configurations.

As shown in FIG. 1A, the single-boom aircraft model 100 also includes a wing twist 106. The multi-disciplinary aircraft design system can modify the wing twist 106, such as increasing or decreasing the amount of twist (or the direction of twist) of the wing of the single-boom aircraft model 100.

In addition, as illustrated in FIG. 1A, the single-boom aircraft model 100 also includes ailerons 108. In particular each wing of the single-boom aircraft model 100 includes an aileron 108. The multi-disciplinary aircraft design system can modify the ailerons 108 to optimize the single-boom aircraft model 100. For example, in one or more embodiments, the multi-disciplinary aircraft design system modifies the size of the ailerons 108 (e.g., the area, depth, and/or length of the ailerons 108).

Furthermore, as shown in FIG. 1A, the single-boom aircraft model 100 also includes an empennage 110. In particular, the empennage 110 includes a horizontal stabilizer 110a and a vertical stabilizer 110b. Although not illustrated, the horizontal stabilizer 110a can include an elevator and the vertical stabilizer 110b can include a rudder. As mentioned above, the multi-disciplinary aircraft design system can modify the size of the empennage 110. For example, the multi-disciplinary aircraft design system can modify the horizontal tail area (e.g., the area of the horizontal stabilizer 110a) and/or the vertical tail area (e.g., the area of the vertical stabilizer 110b).

Moreover, as illustrated in FIG. 1A, the single-boom aircraft model 100 also includes a taper ratio. In particular, the single-boom aircraft model 100 includes a taper ratio defined by a tip chord 112a and a root chord 112b. As mentioned, the multi-disciplinary aircraft design system can modify the taper ratio 112 (e.g., by increasing and/or decreasing the tip chord 112a and/or the root chord 112b).

As discussed above, the multi-disciplinary aircraft design system can utilize a variety of different design variables (e.g., in addition to or different than those shown in FIG. 1A). For example, the multi-disciplinary aircraft design system can also utilize maximum gross take-off weight, cruise lift coefficient, tail volume coefficient, or pod span location as design variables.

As mentioned above, the multi-disciplinary aircraft design system can generate aircraft models in relation to single-boom or multi-boom aircraft. For example, FIG. 1B illustrates a configuration of design variables in the multi-boom aircraft model 150. As illustrated, the multi-boom aircraft includes a propulsion system 152 (i.e., with four propellers instead of two), a wing structure 154, a wing twist 156, ailerons 158, two empennages 160 (with two vertical stabilizers and two horizontal stabilizers), and a taper ratio 162 defined by a tip chord 162a and a root chord 162b.

As mentioned previously in many circumstances design variables of an aircraft model are co-dependent, such that modifications to one design variable will impact the performance of the aircraft model and the design of other corresponding design variables. Accordingly, in one or more embodiments, the multi-disciplinary aircraft design system utilizes a unique optimization framework to generate aircraft models (e.g., determine design variables) based on aerodynamic, structural, and energy performance.

Figure 2:
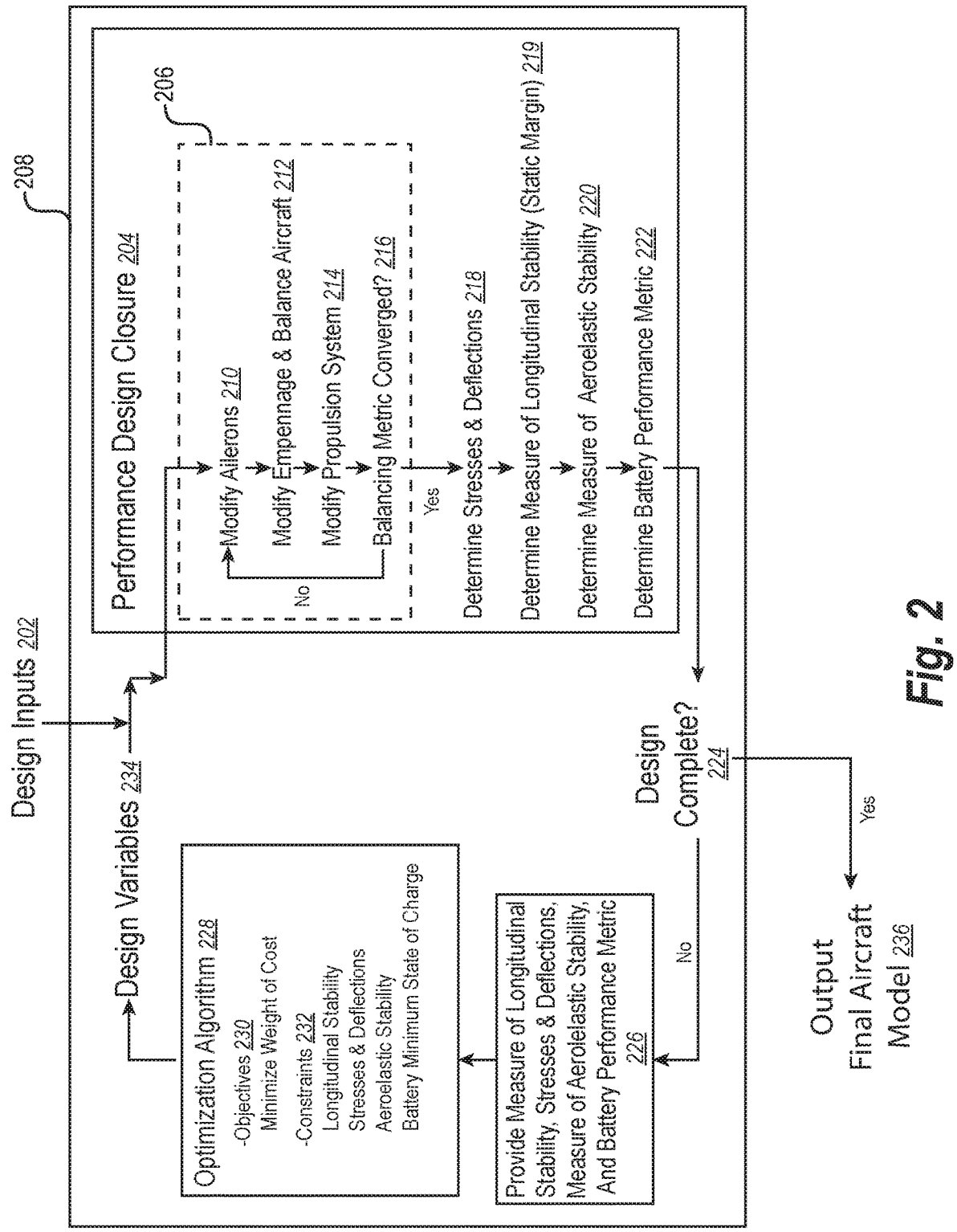
FIG. 2 illustrates a schematic diagram of a multidisciplinary design optimization process for generating a modified aircraft model in accordance with one or more embodiments.

For example, FIG. 2 illustrates a schematic diagram of a multidisciplinary design optimization process for generating an aircraft model (e.g., a boom aircraft model) in accordance with one or more embodiments. As shown, FIG. 2 the multidisciplinary design optimization process begins with receiving design inputs 202. The multidisciplinary design optimization process also applies an optimization loop 208. In particular, the optimization loop 208 includes a performance design closure 204 that itself includes an inner loop 206. By repeatedly performing the optimization loop 208 with the performance design closure 204 (including the inner loop 206), the multi-disciplinary aircraft design system can generate an improved aircraft model jointly optimized based on aerodynamic, structural, and energy performance.

As just mentioned, the multi-disciplinary aircraft design system can utilize the design inputs 202 to generate an aircraft model. The design inputs 202 include a variety of different factors, features, or metrics (that the multi-disciplinary aircraft design system does not change in generating an aircraft model). The multi-disciplinary aircraft design system can utilize a variety of design inputs. For example, in one or more embodiments, the multi-disciplinary aircraft design system utilizes design inputs that include mission information (e.g., flight altitude, flight duration, location, amount of sunlight for charging solar batteries), payload (e.g., weight of communication equipment, individuals, or baggage), winds (e.g., estimated head-wind, tail-wind or wind changes), propeller efficiency, material properties (e.g., properties of materials utilized for the aircraft model, such as material strength, or stress-strain curves), number of propellers, stability margin (e.g., safety margin for stability), or battery specific energy density, etc.

As shown in FIG. 2, the multi-disciplinary aircraft design system can utilize the design inputs 202 together with design variables 234 (e.g., initial or input design variables) as input to the performance design closure 204. The multi-disciplinary aircraft design system can generate and/or identify an input set of design variables. For example, in one or more embodiments, the multi-disciplinary aircraft design system randomly populates the input set of design variables within a range of possible values associated with each design variable. In one or more embodiments, the multi-disciplinary aircraft design system generates an input set of design variables based on user input (e.g., user input of an input set of design variables to consider). Moreover, as shown, the multi-disciplinary aircraft design system can also obtain an input set of design variables from a previous iteration of the optimization loop 208.

As illustrated, regardless of the input set of design variables, the multi-disciplinary aircraft design system can repeatedly modify the design variables 234 (e.g., repeatedly generate modified aircraft models with modified design variables) to generate an improved aircraft model. In particular, as shown in FIG. 2, the multi-disciplinary aircraft design system provides the design inputs 202 and the design variables 234 to the design closure 204. Moreover, the multi-disciplinary aircraft design system implements the inner loop 206. As illustrated, the inner loop 206 iteratively modifies various systems of the aircraft model until converging.

Indeed, as discussed above a change in one aircraft model system can impact performance of the aircraft model and the design for other systems. For example, a change in an empennage and wing location will change the aerodynamic performance and the center of gravity of an aircraft model. This, in turn, will change the propulsion needed to satisfy performance criteria and a corresponding size of the propulsion system. A change in the size of the propulsion system will further change the center of gravity and flight characteristics of the aircraft model, which can necessitate further changes to the aileron size and empennage size (or wing location) for satisfying performance criteria.

Accordingly, as shown in FIG. 2, the multi-disciplinary aircraft design system utilizes the inner loop 206 to iteratively (and jointly) modify certain systems based on performance criteria until the systems converge. In particular, the multi-disciplinary aircraft design system performs the act 210 of modifying the ailerons, the act 212 of modifying the empennage and balancing the aircraft model (by translating the wing or batteries), the act 214 of modifying the propulsion system, and the act 216 of determining whether a balancing metric has converged.

For example, the multi-disciplinary aircraft design system can resize the ailerons based on the aircraft model and one or more aileron performance criteria. The multi-disciplinary aircraft design system can then resize the empennage and balance the aircraft (by modifying wing location) based on the aircraft model (with the modified ailerons) and empennage performance criteria. The multi-disciplinary aircraft design system can then determine aerodynamic performance of the aircraft model and re-size the propulsion system (with the modified ailerons and the modified empennage) based on propulsion performance criteria.

The multi-disciplinary aircraft design system can then determine a balancing metric of the aircraft model (with the modified ailerons, the modified empennage, and the modified propulsion system). For example, the multi-disciplinary aircraft design system can determine a center of gravity of the aircraft model and/or a battery weight of the aircraft model. The multi-disciplinary aircraft design system can compare the balancing metric with a previous balancing metric (from a previous iteration of the inner loop 206) to determine whether the inner loop 206 has converged. For example, if a balancing metric from a first iteration of the inner loop 206 is within a tolerance of a balancing metric from a second iteration of the inner loop 206, the multi-disciplinary aircraft design system can determine that the inner loop 206 has converged (and exit the inner loop 206). Accordingly, utilizing the inner loop 206, the multi-disciplinary aircraft design system can converge on a closed design that satisfies balancing requirements.

As shown, upon exiting the inner loop 206, the multi-disciplinary aircraft design system determines how the balanced aircraft model (with the modified ailerons, the modified empennage, and the modified propulsion system) performs under various circumstances, loads, or missions. In particular, as illustrated, the multi-disciplinary aircraft design system performs the act 218 of determining stresses and deflections, the act 219 of determining a measure of longitudinal stability (static margin), the act 220 of determining a measure of aeroelastic stability, and the act 222 of determining a battery performance metric.

For example, to perform the act 218, the multi-disciplinary aircraft design system can apply a series of performance loads to the aircraft model and determine stresses and deflections resulting from the performance load. Moreover, to perform the act 219, the multi-disciplinary aircraft design system can analyze the aircraft model to determine static margin (e.g., distance between the center of gravity of the aircraft model and a neutral point of the aircraft measured as the net moment of horizontal surfaces of the aircraft model). Similarly, to perform the act 220, the multi-disciplinary aircraft design system can determine a measure of aeroelastic stability of the aircraft model for one or more oscillation instability modes throughout a flight envelope. Further, the multi-disciplinary aircraft design system can perform the act 222 by determining a battery performance metric of the aircraft model for a test mission. Additional detail regarding the acts 218-222 is provided below in relation to FIG. 5.

As shown in FIG. 2, the multi-disciplinary aircraft design system can also perform the act 224 of determining whether the aircraft model is complete. For example, upon performing multiple iterations of the optimization loop 208, the multi-disciplinary aircraft design system can determine whether the design is complete utilizing a variety of different approaches. For example, the multi-disciplinary aircraft design system can determine that an aircraft model is complete after a pre-determined number of iterations (e.g., five iterations). Moreover, the multi-disciplinary aircraft design system can determine that the aircraft model is complete based on convergence of the aircraft model (e.g., by comparing one or more design variables between two iterations). Moreover, the multi-disciplinary aircraft design system can also determine that the design is complete by ensuring that the aircraft model satisfies one or more constraints.

As shown in FIG. 2, if the multi-disciplinary aircraft design system determines that the aircraft model is not complete, the multi-disciplinary aircraft design system can utilize an optimization algorithm to modify one or more design variables. In particular, the multi-disciplinary aircraft design system can perform the act 226 of providing the determined measure of longitudinal stability, the determined stresses and/or deflections, the determined measure of aeroelastic stability, and the determined battery performance metric to the optimization algorithm 228. As shown, the optimization algorithm 228 can then generate modified design variables (e.g., modify the design variables 234) based on the determined measure of longitudinal stability, the determined stresses and deflections, the determined measure of aeroelastic stability, and the determined battery performance metric.

In particular, the optimization algorithm 228 can explore the design space to achieve objectives 230 subject to constraints 232. For example, in relation to FIG. 2, the multi-disciplinary aircraft design system utilizes the objectives 230 of minimizing weight (and/or cost). Moreover, the multi-disciplinary aircraft design system utilizes the constraints 232 of longitudinal stability constraints, stress and/or deflection constraints, aeroelastic stability constraints, and battery performance constraints.

The multi-disciplinary aircraft design system can ensure that design variables satisfy the constraints 232 by comparing the constraints 232 to performance metrics determined in the performance design closure 204. For example, the multi-disciplinary aircraft design system can compare the constraints 232 to the determined measure of longitudinal stability, the determined stresses and/or deflections, the determined measure of aeroelastic stability, and the determined battery performance metric provided to the optimization algorithm 228 at the act 226. If the performance metrics fail to satisfy the constraints, the multi-disciplinary aircraft design system can utilize the optimization algorithm to modify design variables that will satisfy the constraints. The multi-disciplinary aircraft design system can thus iteratively explore the design space to achieve the objectives 230 within the constraints 232.

The multi-disciplinary aircraft design system can utilize a variety of different optimization algorithms. For example, in one or more embodiments, the multi-disciplinary aircraft design system utilizes an optimization algorithm that comprises a process-integration and optimization environment for design space exploration and optimization. Specifically, the multi-disciplinary aircraft design system can utilize one or more versions of modeFrontier (developed by ESTECO).

Utilizing the optimization algorithm 228, the multi-disciplinary aircraft design system can select modified design variables and generate a modified aircraft model. Moreover, the multi-disciplinary aircraft design system can then repeat one or more acts to further revise the modified aircraft model (and the modified design variables). For example, the multi-disciplinary aircraft design system can provide modified design variables 234 to the performance design closure 204, repeat the inner loop 206 (by iteratively performing the acts

210-216), repeat the acts 218-226, and again apply the optimization algorithm 228. The multi-disciplinary aircraft design system can repeat this optimization loop 208 until the aircraft model is complete (e.g., as described in relation to the act 224).

In one or more embodiments, the multi-disciplinary aircraft design system can utilize the optimization algorithm 228 to efficiently converge to a final aircraft model. In particular, some conventional optimization approaches seek to identify improved solutions by directly calculating derivatives and gradients of the problem. This approach is very computationally taxing. The multi-disciplinary aircraft design system can determine a rough estimate of the derivatives of the problem that is computationally efficient, but still leads toward a more optimal solution (e.g., by determining two or more values of the function rather than the derivative of the function). This quasi-Newtonian approach still guarantees a strong convergence (e.g., two to three iterations) while reducing computational load. In this manner, the multi-disciplinary aircraft design system can generally identify a final aircraft model in two to three iterations of the optimization loop 208.

As illustrated in FIG. 2, upon determining that the aircraft design is complete (at the act 224), the multi-disciplinary aircraft design system can generate an output 236. As shown, the output 236 can include a final aircraft model that includes final design variables (including final ailerons, final empennage, final propulsion system, or final battery size). Moreover, the output 236 can include one or more performance metrics (such as a measure of longitudinal stability, stresses and deflections, a measure of aeroelastic stability, or a battery performance metric for the final aircraft model).

The process (e.g., the acts 202-226 and other acts) described in relation to FIG. 2 is intended to be illustrative of an exemplary process in accordance with the present disclosure, and is not intended to limit potential embodiments. Alternative embodiments can include additional, fewer, or different acts or process than those articulated in FIG. 2. For instance, in one or more embodiments, the multi-disciplinary aircraft design system may modify fewer or different aircraft model systems in the inner loop 206 (e.g., omit the empennage, the ailerons, or some other system). Similarly, although not illustrated, in one or more embodiments, the multi-disciplinary aircraft design system provides modified ailerons, a modified empennage, a modified propulsion system, and a balancing metric to the optimization algorithm 228 to utilize in selecting modified design variables. Moreover, even though the optimization algorithm 228 includes particular objectives and constraints, the multi-disciplinary aircraft design system can utilize different objectives and constraints (e.g., optimize to minimize deflections or maximize aeroelastic stability while maximizing battery performance).

Additionally, the acts described in relation to FIG. 2 may be performed in a different order, may be repeated or performed in parallel with one another, or may be performed in parallel with different instances of the same or similar acts. For example, although FIG. 2 illustrates performing the acts 210-216, the acts may be performed in a different order (e.g., perform the act 214, then the act 212, then the act 210). Similarly, although FIG. 2 illustrates performing the acts 218-222 in a particular order, the multi-disciplinary aircraft design system may perform them in a different order (e.g., the act 222, then the act 220, then the act 218, then the act 219).

As mentioned above, the multi-disciplinary aircraft design system can utilize design variables to determine performance of a particular aircraft model. Moreover, many design variables are coupled, meaning that changes in one design variable impact the aerodynamic, structural, and/or energy performance of the aircraft model. The multi-disciplinary aircraft design system can utilize a variety of lightweight algorithms to determine and modify the performance characteristics of the aircraft model.

For example, in one or more embodiments, the multi-disciplinary aircraft design system utilizes an airfoil performance algorithm (e.g., XFOIL) to determine sectional low-Reynolds number aerodynamics. Similarly, the multi-disciplinary aircraft design system utilizes a structural analysis algorithm (e.g., Co-Blade) to determine cross-sectional structural properties. The multi-disciplinary aircraft design system can provide these distributed aero-structural cross-sectional properties as input to an aircraft flight modeling algorithm (e.g., ASWING) to determine distributed loads (across the aircraft model, such as the wing) and overall flight stability and dynamics characteristics (e.g., aeroelastic stability and/or longitudinal stability).

In one or more embodiments, the aircraft flight modeling algorithm integrates sectional aerodynamics using unsteady lifting-line theory and integrates distributed structural properties using geometrically nonlinear beam theory. Moreover, in some embodiments, the multi-disciplinary aircraft design system returns distributed loads from the aircraft flight modeling system to the structural analysis algorithm to compute stresses and deflections. The multi-disciplinary aircraft design system further utilizes the aircraft flight modeling algorithm to determine flight polars (e.g., relationship between lift and drag coefficients) while utilizing the airfoil performance algorithm to determine pole drag corrections.

To illustrate, the multi-disciplinary aircraft design system can utilize the airfoil performance algorithm, aircraft flight modeling algorithm, and structural analysis algorithm to model aerodynamic performance of an aircraft model. For example, the multi-disciplinary aircraft design system can characterize a set of airfoils appropriate for a target Reynolds number with the airfoil performance algorithm. The multi-disciplinary aircraft design system can then construct an airfoil in the form of thickness-indexed multi-dimensional tables (e.g., five-dimensional tables) representing sectional $C_l$ (cruise lift coefficient), $C_d$ (drag coefficient), and $C_m$ (pitching moment coefficient, also constructed for various angles of attack, designated $C_{m\alpha}$), Reynolds number, control surface relative chord, and deflection. At each Reynolds number, the multi-disciplinary aircraft design system constructs an equivalent low order (and aircraft flight modeling algorithm-compatible) polar alongside with control derivatives. The multi-disciplinary aircraft design system subsequently utilizes these parameters when building a surface (e.g., wing or tails) and running the aircraft flight modeling algorithm for flight loads and overall vehicle polar.

Furthermore, the multi-disciplinary aircraft design system can capture lifting surface performance in a two-fold way from the induced flow field computed by the aircraft flight modeling algorithm as well as the reported span efficiency factor. First, sectional lift and profile drag coefficients are looked-up based on the above-mentioned actual airfoil database and span-integrated. This allows for more accurate stall capture. Second the actual span-integrated lift coefficient is used to compute the induced drag alongside the span-efficiency factor. Other drag sources are added (e.g., for the booms based on wetted area and friction factor) and margin is allocated to interference drag.

Moreover, the multi-disciplinary aircraft design system can also utilize lightweight algorithms with regard to structural analysis. For example, as discussed above, in one or more embodiments, the multi-disciplinary aircraft design system utilizes a structural concept that comprises a box-spar with sandwich panels (although the multi-disciplinary aircraft design system can utilize other structural concepts) that consist of unidirectional, plain-weave and core plies to provide bending and torsional stiffness. As mentioned above, the multi-disciplinary aircraft design system (e.g., utilizing the optimization algorithm 228) can modify the number of plies and the geometry of the sparbox as a design variable (e.g., modifying wing geometry). The multi-disciplinary aircraft design system can utilize a structural analysis algorithm that employs classical laminate theory to determine failure stress criteria for a given loading. Moreover, the multi-disciplinary aircraft design system can utilize a structural analysis algorithm that employs Euler-Bernoulli beam theory to compute wing displacements and twists.

Figure 3A:
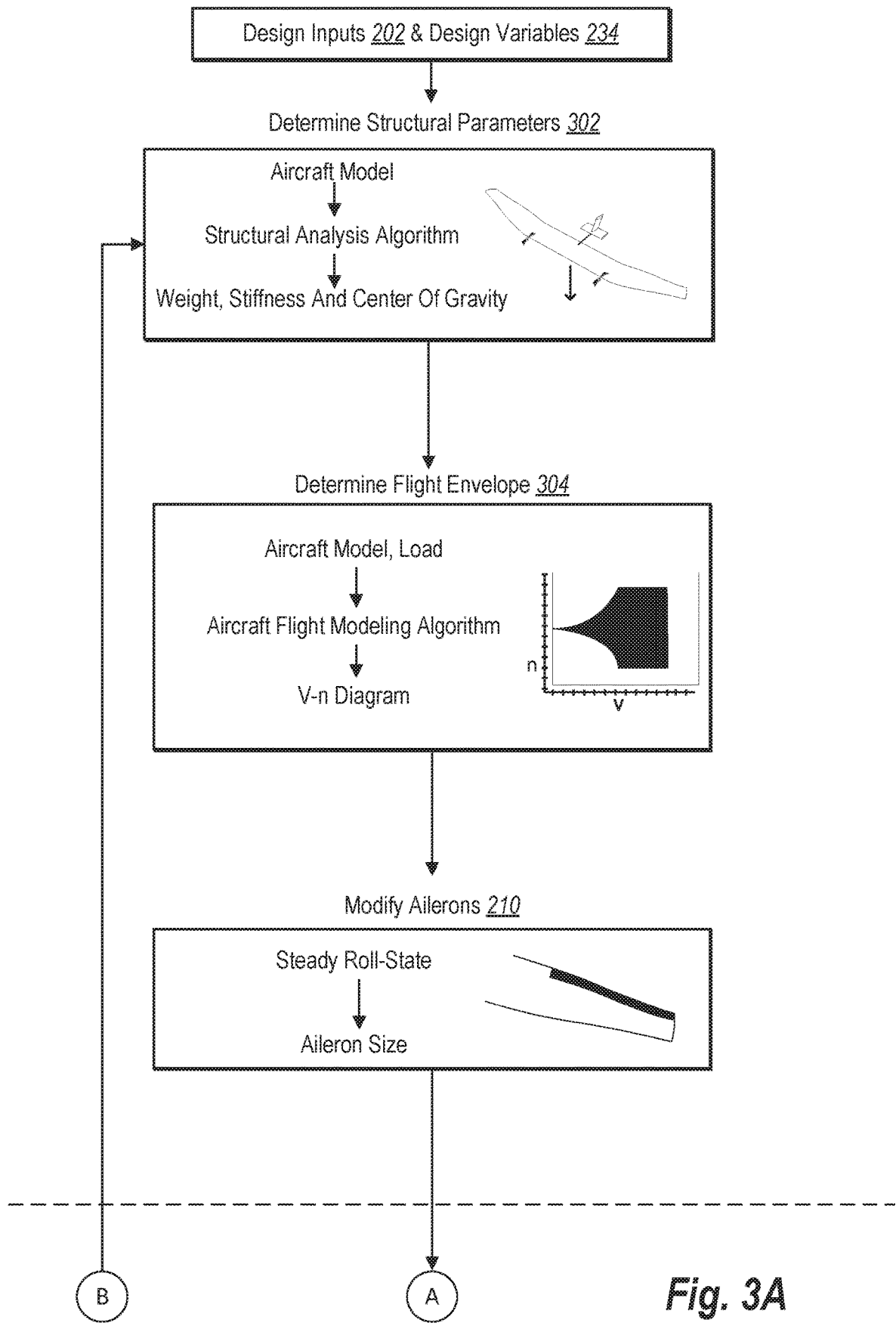
FIGS. 3A-3B illustrates a schematic diagram of a process of iteratively modifying one or more systems of an aircraft model in accordance with one or more embodiments.
Figure 3B:
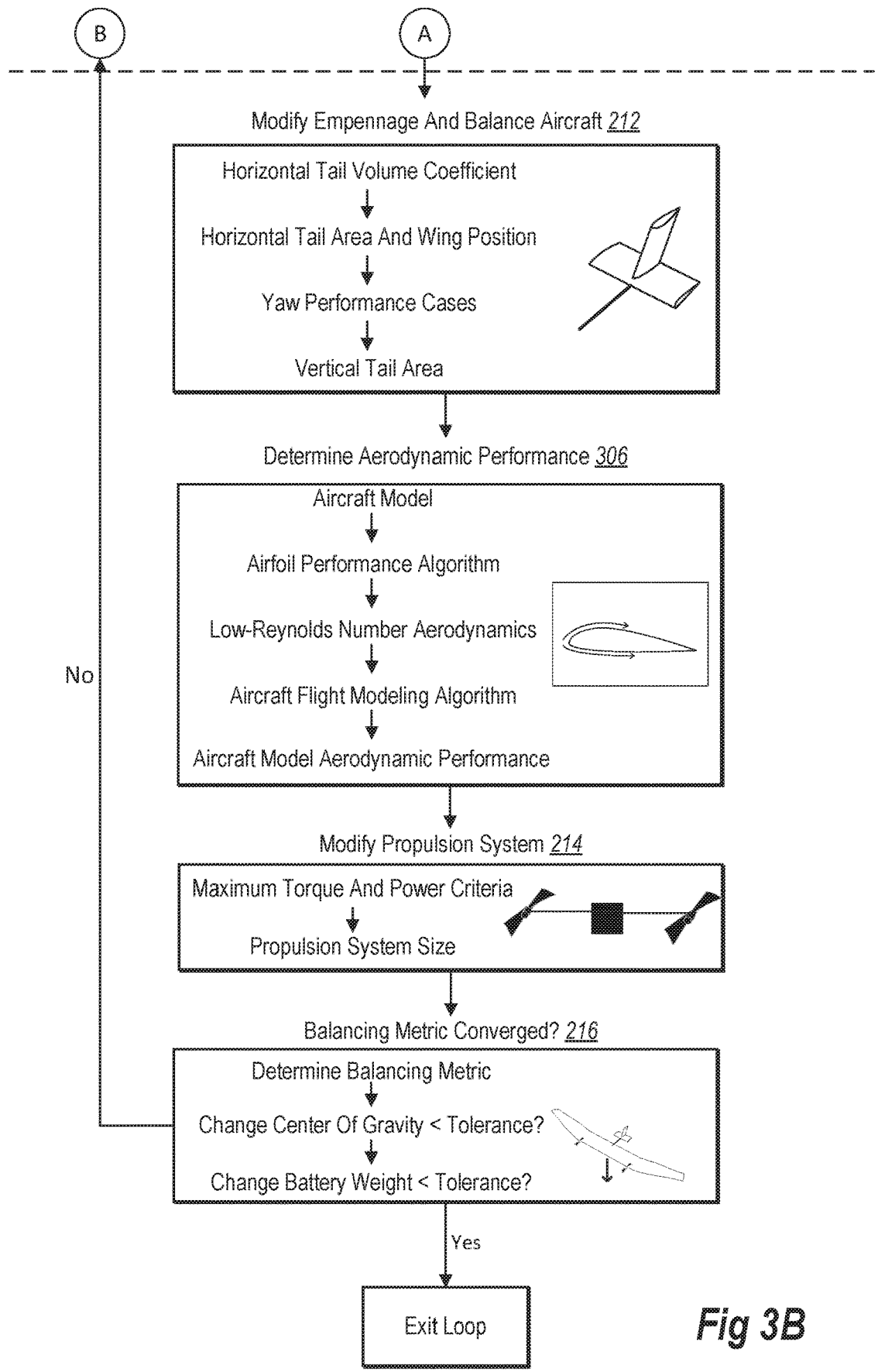
Figure 4:
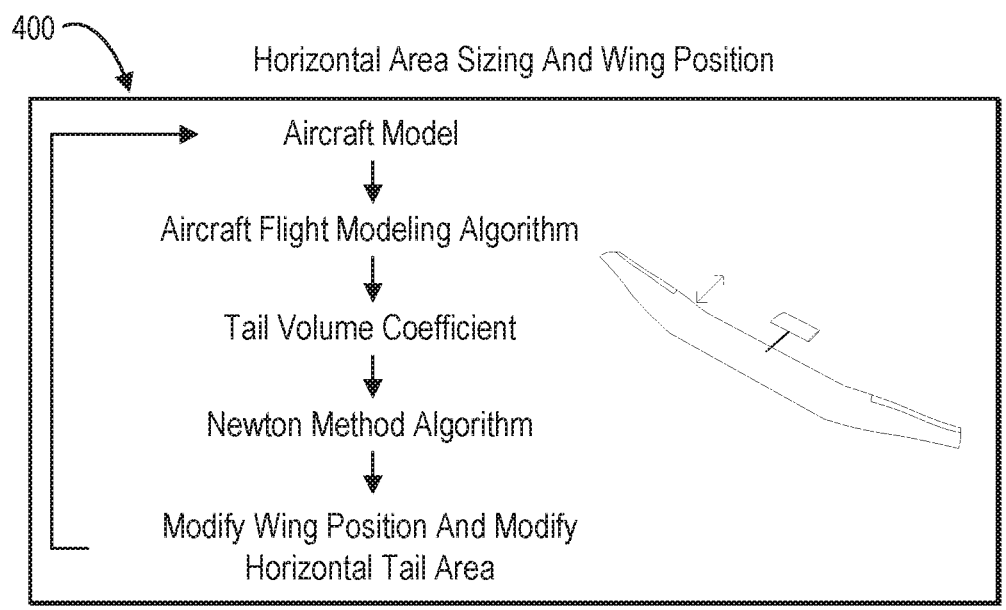
FIG. 4 illustrates a schematic diagram of a process of modifying an empennage of an aircraft model in accordance with one or more embodiments.
Figure 5:
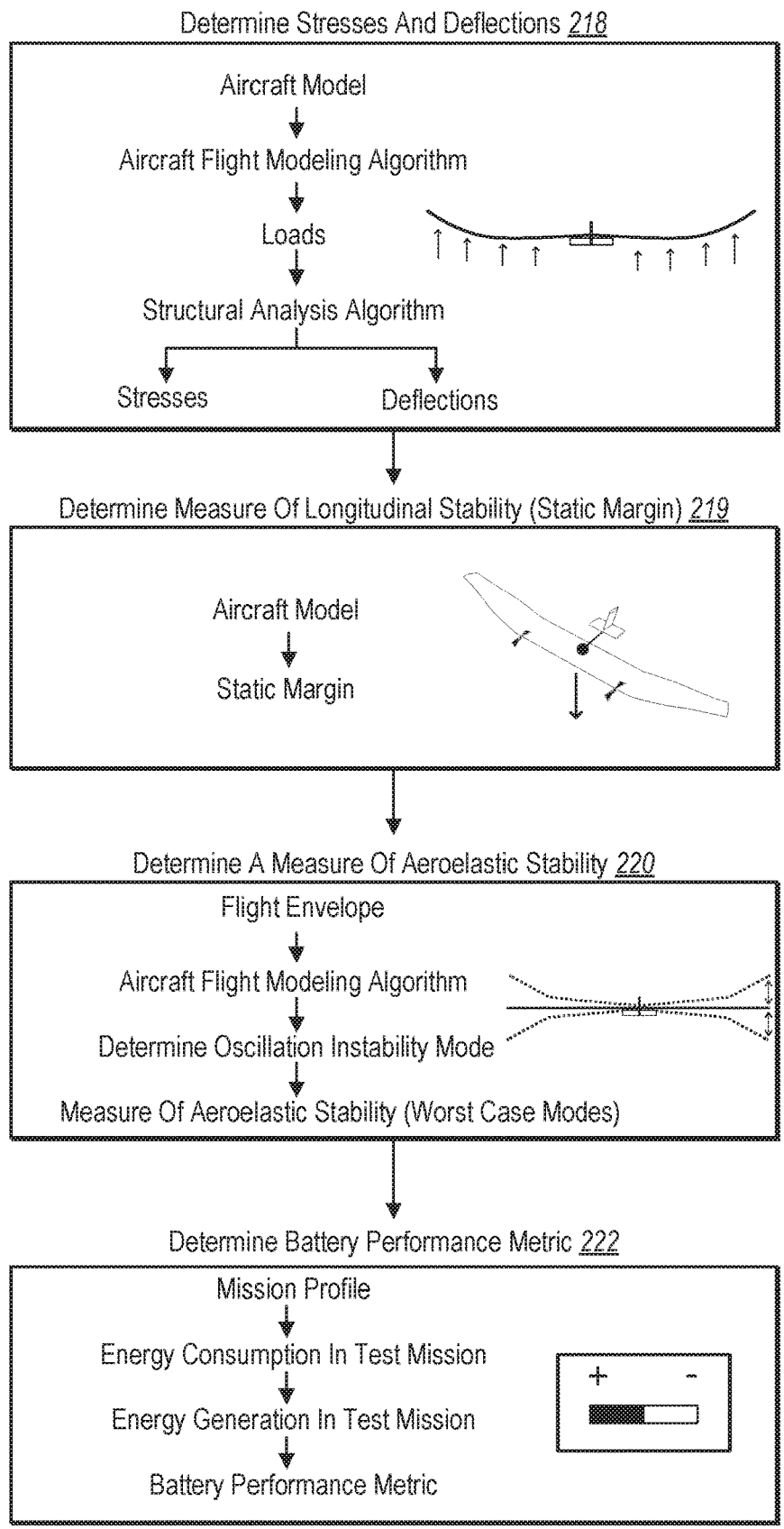
FIG. 5 illustrates a schematic diagram of a process of determining performance metrics of an aircraft model in accordance with one or more embodiments.

FIGS. 3A-5 provide additional detail regarding how the multi-disciplinary aircraft design system utilizes these lightweight algorithms within the performance design enclosure 204 in one or more embodiments. In particular, FIGS. 3A-3B provide additional detail regarding the inner loop 206, FIG. 4 provides additional detail regarding modifying the empennage at the act 212, and FIG. 5 provides additional detail regarding the acts 218-222 for determining performance metrics.

As mentioned above in relation to the inner loop 206 of FIG. 2, the multi-disciplinary aircraft design system can iteratively modify subsystems of an aircraft model in light of performance criteria. FIGS. 3A-3B illustrates additional detail regarding iteratively modifying these subsystems in accordance with one or more embodiments. Specifically, FIGS. 3A-3B illustrate utilizing the design inputs 202 and the design variables 234 to iteratively determine structural parameters such as weight, stiffness, and center of gravity (an act 302), determine a flight envelope (an act 304), modify ailerons (e.g., the act 210), modify an empennage (e.g., the act 212), modify a propulsion system (e.g., the act 214), and determine whether a weight metric has converged (e.g., the act 216).

For example, as shown in FIG. 3A, in one or more embodiments, the multi-disciplinary aircraft design system performs the inner loop 206 by obtaining the design inputs 202 and the design variables 234. Moreover, the multi-disciplinary aircraft design system utilizes the design inputs 202 and/or the design variables 204 (e.g., the aircraft model) to perform an act 302 of determining structural parameters.

To illustrate, as shown in FIG. 3A, in one or more embodiments, the multi-disciplinary aircraft design system provides the aircraft model (e.g., one or more design variables and design inputs) to a structural analysis algorithm (e.g., Co-blade). The structural analysis algorithm evaluates the aircraft model to determine structural parameters, such as weight (of the aircraft and/or subsystems), stiffness, and/or center of gravity. For example, the structural analysis algorithm can analyze wings, ailerons, an empennage, a propulsion system, and other subsystems and determine a weight of the aircraft model and a center of gravity of the aircraft model. Furthermore, the structural analysis algorithm can determine stiffness of the overall aircraft model (or portions of the aircraft model, such as the wing). Moreover, as part of the act 302, the multi-disciplinary aircraft design system can also utilize the aircraft flight modeling algorithm to determine structural cross-sectional properties (e.g., properties of a cross-section of the wing).

As shown in FIG. 3A, the multi-disciplinary aircraft design system then performs the act 304 of determining a flight envelope. More particularly, the multi-disciplinary aircraft design system provides the aircraft model (e.g., a subset of the design inputs 202 and/or the design variables 234 together with the determined weight and center of gravity of the aircraft model) and loads to an aircraft flight modeling algorithm. The aircraft flight modeling algorithm determines a V-n diagram. As described above, the V-n diagram defines a flight envelope for the aircraft as a matter of velocity and load (and/or altitude). Upon generating the V-n diagram, the multi-disciplinary aircraft design system can then utilize the V-n diagram for various performance criteria. For example, the multi-disciplinary aircraft design system can determine a load and/or velocity at the maximum capabilities of the aircraft model.

To illustrate, in one or more embodiments, the multi-disciplinary aircraft design system generates the aircraft V-n diagram from specified maximum load factors, maximum lift coefficient at target Reynolds numbers (as discussed above), and cruise airspeed. Moreover, in some embodiments, the dive speed is described relative to the cruise airspeed. The multi-disciplinary aircraft design system can utilize load cases composed of both steady and unsteady conditions particular to the type of aircraft under investigation. For example, steady and quasi-steady cases include sudden control surface deflections as well as pull-ups. Unsteady cases include 1-cosine gust cases for low wing loading type airplanes.

As shown in FIG. 3A, the multi-disciplinary aircraft design system can also perform the act 210 of modifying ailerons. In particular, as mentioned above, the multi-disciplinary aircraft design system can size the ailerons based on one or more performance criteria. For example, in relation to FIG. 3A, the multi-disciplinary aircraft design system sizes the ailerons based on a steady roll-state. In particular, the size of the ailerons can be determined from a steady roll-state by estimating aileron deflection angle, estimating roll damping, estimating roll authority, and determining a satisfactory roll helix angle.

Furthermore, as illustrated in FIG. 3A, the multi-disciplinary aircraft design system can also perform the act 212 of modifying (e.g., sizing) an empennage and balancing the aircraft. In particular, the multi-disciplinary aircraft design system can resize an empennage by changing horizontal tail/stabilizer area and/or vertical tail/stabilizer area of the aircraft model (with the modified ailerons). Furthermore, as shown, the multi-disciplinary aircraft design system can also determine a wing position (or battery position) in sizing the horizontal tail/stabilizer area. Indeed, inasmuch as wing position (e.g., position along a fuselage) also impacts longitudinal stability, the multi-disciplinary aircraft design system can jointly modify tail area and wing position together. Accordingly, the act 212 of modifying the empennage can also be viewed as a modification of subsystems to balance the design aircraft.

Indeed, as shown in FIG. 3A, the act 212 can include modifying a horizontal tail area and wing position to balance the aircraft. In particular, the multi-disciplinary aircraft design system enforces longitudinal trim and stability requirements by sizing the horizontal tail area and moving the wing position along the boom. In one or more embodiments, the multi-disciplinary aircraft design system solves the two-equations, two-unknowns systems utilizing a Newton method to capture the impact of wing, boom, and tail deformation on the resolved quantities.

To illustrate, as shown in FIG. 3A, the multi-disciplinary aircraft design system analyzes the aircraft model to determine a horizontal tail volume coefficient. The horizontal tail volume coefficient relates the area of the horizontal tail surface, the distance the area is from the center of gravity of the aircraft model, the wing area, the mean aerodynamic wing chord and the wing span. The multi-disciplinary aircraft design system then determines horizontal tail area and wing position based on the horizontal tail volume coefficient. In particular, the multi-disciplinary aircraft design system modifies horizontal tail area and wing position to satisfy a horizontal tail volume coefficient constraint and a longitudinal trim constraint (i.e., two measures of longitudinal stability that satisfy longitudinal stability criteria so that the aircraft is balanced). Additional detail regarding modifying the horizontal tail area and the wing position (as a longitudinal stability loop) is provided below in relation to FIG. 4.

Furthermore, as shown in FIG. 3A, the act 212 can include modifying a vertical stabilizer area based on a yaw performance case. For example, the multi-disciplinary aircraft design system can determine a worse case yaw amongst a variety of different yaw performance cases. To illustrate, the multi-disciplinary aircraft design system can determine a previously recorded adverse yaw of a flexible wing. Similarly, the multi-disciplinary aircraft design system can utilize an aircraft flight modeling algorithm to determine a measure of yaw in a motor out case for the aircraft model (with the modified ailerons) or determine a measure of yaw in a landing in side slip case for the design aircraft (with the modified ailerons). The multi-disciplinary aircraft design system can compare the measure of yaw from these scenarios and identify a worst case yaw. The multi-disciplinary aircraft design system can then size the vertical area of the empennage to satisfy the worst case yaw.

As illustrated in FIG. 3A, the multi-disciplinary aircraft design system can also perform the act 306 of determining aerodynamic performance. As illustrated, the multi-disciplinary aircraft design system can provide the aircraft model (e.g., a subset of design inputs and/or design variables, such as a wing cross-section) to an airfoil performance algorithm. The airfoil performance algorithm can determine low-Reynolds number aerodynamics, such as lift and drag predictions for the airfoil. To illustrate, as described above, the airfoil performance algorithm can determine cruise lift coefficient, drag coefficient, pitching moment coefficient, or control surface relative chord.

Moreover, the multi-disciplinary aircraft design system can then provide the low-Reynolds aerodynamics to an aircraft flight modeling algorithm. Specifically, the multi-disciplinary aircraft design system can provide the low-Reynolds aerodynamics together with the aircraft model and structural cross-sectional properties (determined by the structural analysis algorithm) to the aircraft flight modeling system. The aircraft flight modeling system can then determine aerodynamics for the aircraft model. For example, the aircraft flight modeling system can determine distributed loads, flight stability, and dynamics characteristics (as described above).

As shown in FIG. 3B, the multi-disciplinary aircraft design system can also perform the act 214 of modifying the propulsion system. In particular, the multi-disciplinary aircraft design system can modify the propulsion system based on one or more propulsion criteria. To illustrate, the multi-disciplinary aircraft design system can utilize the aircraft flight modeling algorithm to analyze the aircraft model (e.g., with the modified ailerons and the modified empennage) according to one or more propulsion criteria. For example, the multi-disciplinary aircraft design system can determine whether the propulsion system satisfies maximum power and torque criteria at take-off and/or at a maximum altitude climb. The multi-disciplinary aircraft design system can then modify the size of the propulsion system to satisfy the one or more propulsion criteria (e.g., such that the propulsion system can generate power and torque required for take-off or maximum altitude climb).

Although the act 214 and the act 306 are illustrated as separate in FIG. 3A, the act 306 can also be performed as part of the act 214. For example, the multi-disciplinary aircraft design system can determine aerodynamics for modeling climb of the aircraft model at the act 214 and then modify the propulsion system to provide thrust needed to satisfy propulsion criteria.

Upon determining the modified propulsion system, the multi-disciplinary aircraft design system can perform the act 216 of determining whether a balancing metric has converged. As shown in FIG. 3B, in one or more embodiments, the balancing metric includes a center of gravity of the aircraft and a battery weight. In one or more embodiments, the multi-disciplinary aircraft design system performs the act 216 by repeating the act 302 (determining subsystem weight and center of gravity). In particular, the act 216 can include determining weight and center of gravity of the aircraft model based on the modified ailerons, the modified empennage, and the modified propulsion system. Moreover, the act 216 can include determining a battery weight.

The multi-disciplinary aircraft design system can then determine whether the balancing metric has converged by determining a change in the balancing metric. For example, the multi-disciplinary aircraft design system can determine a change (e.g., a difference) between a first center of gravity determined from a first iteration of the inner loop 206 and a second center of gravity determined from a second iteration of the inner loop 206. Similarly, the multi-disciplinary aircraft design system can determine a change (e.g., a difference) between a first battery weight from a first iteration of the inner loop 206 and a second battery weight form a second iteration of the inner loop 206.

As illustrated, the multi-disciplinary aircraft design system can also compare the change in the balancing metric to one or more tolerances. For example, the multi-disciplinary aircraft design system can determine whether a change in center of gravity is less than a tolerance. Similarly, the multi-disciplinary aircraft design system can determine whether a change in battery weight is less than a tolerance. If the change in balancing metric (e.g., the center of gravity and/or the battery weight) satisfies (i.e., is less than) the corresponding tolerance, the multi-disciplinary aircraft design system can exit the inner loop 206. If not, as shown, the multi-disciplinary aircraft design system can perform another iteration of the inner loop 206.

As mentioned above in relation to the act 212, in modifying the empennage, the multi-disciplinary aircraft design system can also balance the aircraft model. In particular, the multi-disciplinary aircraft design system can iteratively modify the horizontal sizing area of the empennage and wing position to enforce longitudinal stability on the aircraft model. Moreover, the multi-disciplinary aircraft design system can satisfy longitudinal stability criteria (e.g., horizontal tail volume coefficient criteria and pitch trim) while accounting for deformation of the aircraft. For example, FIG. 4 illustrates iteratively modifying wing position and horizontal tail area based on a measure of longitudinal stability to satisfy longitudinal stability criteria in accordance with one or more embodiments.

In particular, FIG. 4 illustrates a longitudinal stability loop 400 for modifying the horizontal tail area and wing position. As shown, the multi-disciplinary aircraft design system provides the aircraft model (e.g., with modified ailerons) to the aircraft flight modeling algorithm. The aircraft flight modeling algorithm determines deformation of structural components of the aircraft model, such as wing, boom, and tail. Moreover, the multi-disciplinary aircraft design system determines a (horizontal) tail volume coefficient (e.g., in the deformed state). In addition to horizontal tail volume coefficient, the multi-disciplinary aircraft design system can also determine other measures of longitudinal stability, such as a pitching moment coefficient.

The multi-disciplinary aircraft design system then provides the measure of longitudinal stability to a newton method algorithm (or quasi-newton method algorithm). A newton method algorithm (or Newton Raphson Method algorithm) is a model for finding successively better approximations to the roots of a function. In particular, a newton method algorithm determines the derivative (or slope) of a function and then utilizes the derivative to approximate the root of a function.

As illustrated, the multi-disciplinary aircraft design system can utilize a newton method algorithm to generate a modified wing position and modified horizontal tail area. In particular, the multi-disciplinary aircraft design system can utilize a newton method algorithm to determine a derivative of a function reflecting the modified wing position and the modified horizontal tail area relative to measures of longitudinal stability/longitudinal stability constraints. For example, in one or more embodiments, the multi-disciplinary aircraft design system utilizes two functions (e.g., a function for satisfying the pitch trim condition and a function for horizontal tail volume coefficient constraints) with two unknowns (e.g., horizontal tail area and wing position). The multi-disciplinary aircraft design system utilizes the newton method to approximate a root of the two functions to generate a modified horizontal tail area and modified wing position.

As mentioned above, the multi-disciplinary aircraft design system can also utilize a quasi-newton method algorithm. Indeed, to precisely determine a derivative of a function (in accordance with the newton method algorithm) can require significant computing resources. Accordingly, in one or more embodiments, the multi-disciplinary aircraft design system utilizes a quasi-newton method that estimates the derivative (e.g., slope) of a function. For example, the multi-disciplinary aircraft design system can utilize a quasi-newton method that determines two values of the function and estimates the derivative based on the two points. Because estimating two values of the function is more computationally efficient than determining the derivative precisely, this approach can reduce computational complexity.

Accordingly, using either a newton method algorithm or quasi-newton method algorithm, the multi-disciplinary aircraft design system can generate a modified wing position and horizontal tail area. As illustrated, the multi-disciplinary aircraft design system can update the aircraft model and provide the updated aircraft model (with the modified wing position and modified horizontal tail area) to the aircraft flight modeling algorithm. The aircraft flight modeling algorithm can determine new deformations and a new horizontal tail volume coefficient (and/or other measures of longitudinal stability) which is again analyzed by the newton (or quasi-newton) method algorithm. The multi-disciplinary aircraft design system can iteratively repeat these acts until the wing position and/or horizontal tail area converge (e.g., until reaching a pre-determined number of iterations or until a change in horizontal tail area and wing position between iterations is less than a tolerance value).

Accordingly, the multi-disciplinary aircraft design system can utilize a quasi-newton method with an aircraft flight modeling algorithm in a loop to capture the impact of wing, boom, and tail deformation on longitudinal stability. Moreover, the multi-disciplinary aircraft design system can systematically enforce the sizing of the horizontal tail area and wing position along the boom while satisfying tail volume coefficient constraints as well as resulting in a pitch trimmed configuration.

Turning now to FIG. 5, additional detail will be provided regarding utilizing lightweight algorithms to determine additional performance metrics of the aircraft model. In particular, FIG. 5 provides additional detail regarding the act 218 (determining stresses and deflections), the act 219 (determining a measure of longitudinal stability), the act 220 (determining a measure of aeroelastic stability), and the act 222 (determining a battery performance metric) previously described in relation to FIG. 2.

As shown in FIG. 5, the multi-disciplinary aircraft design system can perform the act 218 of determining stresses and deflections by utilizing an aircraft flight modeling algorithm and a structural analysis algorithm. In particular, the multi-disciplinary aircraft design system can provide an aircraft model (e.g., design variables, design inputs, aero-structural cross-sectional properties, modified ailerons, modified empennage, and modified propulsion system from the inner loop 206) to the aircraft flight modeling algorithm. The aircraft flight modeling algorithm can determine loads corresponding to the aircraft model at various load cases (e.g., at various speeds and loads within the flight envelope). For example, the aircraft flight modeling algorithm can determine loads distributed across the wings when pulling out of a dive (or some other load case). Accordingly, the multi-disciplinary aircraft design system can utilize the aircraft flight modeling algorithm with a list of load cases (including steady and/or unsteady turbulence cases) to determine forces (loads) on the aircraft model from the aerodynamic loading.

Upon determining loads, the multi-disciplinary aircraft design system can then determine stresses and deflections corresponding to the loads. For example, the multi-disciplinary aircraft design system can provide the loads to a structural analysis algorithm. The structural analysis algorithm can determine stresses and deflections of the aircraft model based on the applied loads. For example, the structural analysis algorithm can utilize classical laminate theory to determine failure stress criteria for a given loading. Similarly, the structural analysis algorithm can utilize Euler-Bernoulli beam theory to compute wing displacements and twists. To illustrate, the multi-disciplinary aircraft design system can determine stresses (which include moments or angular stresses) and deflections (which include rotations, twists, or other angular rotations) within the wing when pulling out of a dive based on loads determined by the aircraft flight modeling algorithm.

Although the foregoing example describes determining loads as part of the act 218, in one or more embodiments, the multi-disciplinary aircraft design system does not determine loads as part of the act 218 (but at a different stage of the optimization loop). For example, as discussed above in relation to FIG. 3B, in some embodiments, the multidisciplinary aircraft design system determines loads as part of the inner loop 206 (e.g., at the act 306). In one or more embodiments, the multi-disciplinary aircraft design system can utilize loads calculated at the act 306 for determining stresses and deflections at the act 218.

Furthermore, as shown in FIG. 5, the multi-disciplinary aircraft design system can also perform the act 219 of determining a measure of longitudinal stability. In particular, the multi-disciplinary aircraft design system can determine a static longitudinal stability measure, such as static margin.

As discussed above, the multi-disciplinary aircraft design system can also determine a measure of longitudinal stability in resizing the empennage and balancing the aircraft (e.g., as part of the act 212). Accordingly, in some embodiments, the measure of longitudinal stability determined at the act 219 can include a second measure of longitudinal stability. For example, in one or more embodiments, the multi-disciplinary aircraft design system determines a pitching moment coefficient and horizontal tail volume coefficient as part of the act 212 (in balancing the aircraft). Furthermore, the multi-disciplinary aircraft design system can determine static margin as part of the act 219. The multi-disciplinary aircraft design system can utilize all of these measures of longitudinal stability to generate an improved aircraft model (e.g., in conjunction with the optimization algorithm 228).

As shown in FIG. 5, the multi-disciplinary aircraft design system can also perform the act 220 of determining a measure of aeroelastic stability. For instance, the multi-disciplinary aircraft design system can determine a measure of aeroelastic stability that reflects flutter/damping of various surfaces of the aircraft model (e.g., wings, horizontal tail surfaces, vertical tail surfaces, or boom) at worst case oscillation instability modes.

As illustrated in FIG. 5, in one or more embodiments, the multi-disciplinary aircraft design system utilizes the aircraft flight modeling algorithm to determine a measure of aeroelastic stability. In particular, the multi-disciplinary aircraft design system utilizes the aircraft flight modeling algorithm to analyze oscillation instability modes at various speeds, loads, and/or altitudes within the flight envelope. The aircraft flight modeling algorithm can generate a measure of aeroelastic stability, such as damping of the aircraft model at the various speeds, loads, and/or altitudes. In one or more embodiments, the multi-disciplinary aircraft design system selects the worst case measure of aeroelastic stability (e.g., worst case damping at the worst oscillation instability modes) and utilizes the worst case measure of aeroelastic stability for consideration in optimizing design variables.

To illustrate, in one or more embodiments, the multi-disciplinary aircraft design system characterizes the aeroelastic stability of an airframe of the aircraft model through the flight envelope (altitude, airspeed) using ASWING's modal analysis routine. In some embodiments, the frequency range associated with the structural dynamics are estimated using approximate methods to band-pass only modes of interest and ignore modes associated with the flight dynamics (which are potentially unstable but slow). The worst-case damping ratio seen through the envelope is then returned as an output to an optimization algorithm (e.g., the optimization algorithm 228).

Indeed, as discussed above, the optimization algorithm 228 can analyze the measure of aeroelastic stability utilizing aeroelastic stability constraints. For instance, in one or more embodiments, the multi-disciplinary aircraft design system utilizes an aeroelastic stability constraint where the worst case modes throughout the flight envelope are constrained to have a damping ratio greater than or equal to a pre-determined value (e.g., 3%).

As shown in FIG. 5, the multi-disciplinary aircraft design system can further perform the act 222 of determining a battery performance metric (or energy performance metric that reflects batteries or some other type of fuel). In particular, the multi-disciplinary aircraft design system can determine a battery performance metric for a test mission. As shown, the multi-disciplinary aircraft design system can determine details of a test mission (e.g., a mission profile of a test mission). The multi-disciplinary aircraft design system can determine a test mission based on a pre-determined test mission, from design inputs, from previous steps of the aircraft model, or based on user selection.

For example, in one or more embodiments, the mission test comprises station keeping at altitudes greater or equal to sixty-thousand feet. Moreover, for the mission test the aircraft model is forced to fly at least as fast as a wind speed (the resulting airspeed is selected to minimize power as part of the optimization loop 208). As described previously, the multi-disciplinary aircraft design system determines battery weight, structural characteristics (e.g., deformed shape of the wing and thus solar area of the wing), and aerodynamic characteristics (e.g., aircraft polar) at previous stages of the optimization loop 208 (e.g., as part of the inner loop 206).

As illustrated in FIG. 5, the multi-disciplinary aircraft design system can then determine power consumption and energy generation of the aircraft through the test mission. In particular, the multi-disciplinary aircraft design system can determine power consumption and energy generation at various times steps throughout a duration of the time mission. For example, at each time step, the multi-disciplinary aircraft design system determines energy generated by power generators (e.g., solar panels) and energy consumption (e.g., propulsion system or electronic components of the aircraft model that consume power). For instance, in relation to power consumption, the multi-disciplinary aircraft design system can determine energy for sinks such as avionics and payload. Moreover, the multi-disciplinary aircraft design system determines propulsion-related electrical power from drive efficiencies and drag based on the polar and the required lift. Lift is resolved from flight mechanics equations. With regard to power generation, the multi-disciplinary aircraft design system resolves each solar cell and computes the solar cell's effective efficiency, including its local normal vector (e.g., and corresponding angle to light source), which itself depends on span and chord positions as well as the deflected airframe shape.

Beginning the mission plan at an initial energy state and integrating through the mission test, the multi-disciplinary aircraft design system can determine a battery performance metric. For instance, the multi-disciplinary aircraft design system can determine a minimum battery level throughout the mission test or an ending battery level for the test.

To illustrate, in one or more embodiments, the multi-disciplinary aircraft design system utilizes a mission test for remaining battery charge at the end of the winter solstice. At each time step, power consumers and generators result in a net energy increase or decrease for the batteries. Starting the day at the balanced power time on the winter solstice and time integration through the day yields the batter performance metric: battery end-of-day state of charge.

Although many of the foregoing examples describe a single-boom aircraft model, as mentioned above, the multi-disciplinary aircraft design system can also operate in relation to a multi-boom aircraft model. Thus, for instance, the multi-disciplinary aircraft design system can model deflections of multiple booms and can modify multiple empennages utilizing similar approaches described above.

In one or more embodiments, the multi-disciplinary aircraft design system modifies one or more constraints when analyzing multi-boom aircraft versus single-boom aircraft. Indeed, in relation to single-boom aircraft models, ailerons are typically utilized as roll effectors. The roll power is therefore correlated with torsional stiffness. To maintain adequate levels of stiffness and controllability, the multi-disciplinary aircraft design system can utilize a stress and deflection constraint (e.g., at the optimization algorithm 228). In particular, the multi-disciplinary aircraft design system can constrain wing twist and in-plane deformations to stay below target values (e.g., 3 degrees and 10%).

With regard to multi-boom aircraft models, asymmetric horizontal tail deflections are typically utilized as roll effectors. Accordingly, roll power is generally inversely correlated with wing torsional stiffness. Rather than constraining deformations (as with single-boom aircraft models), the multi-disciplinary aircraft design system can constrain the maximum steady roll state in the optimization loop 208 (e.g., based on the maximum steady roll state achievable).

As discussed above, in addition to boom aircraft models, the multi-disciplinary aircraft design system can also generate flying-wing aircraft or other models. Flying-wing aircraft models have a variety of unique advantages and challenges. Indeed, flying-wing aircraft models may be able to achieve higher aerodynamic performance due to reduced intersection drag contributions (because the empennage is absent). However, wing sweep (needed for stability and trim conditions) has a significant impact on aircraft design. In the low-Reynolds number regime, cross-flow instabilities (if not adequately accounted for) are a potential risk in disrupting intended transition behavior, resulting in a dramatic loss of aerodynamic performance. Moreover, aeroelastic instability issues are often exacerbated for the flying wing configuration. For instance, these configurations are often prone to body-freedom-flutter (BFF), which is an aeroelastic instability arising out of coupling between short-period mode and structural bending mode. The absence of an empennage can imply a low pitch inertia leading to an increase in short-period frequencies that may approach the bending mode frequencies. The frequency coalescence results in a strong instability.

Figure 6:
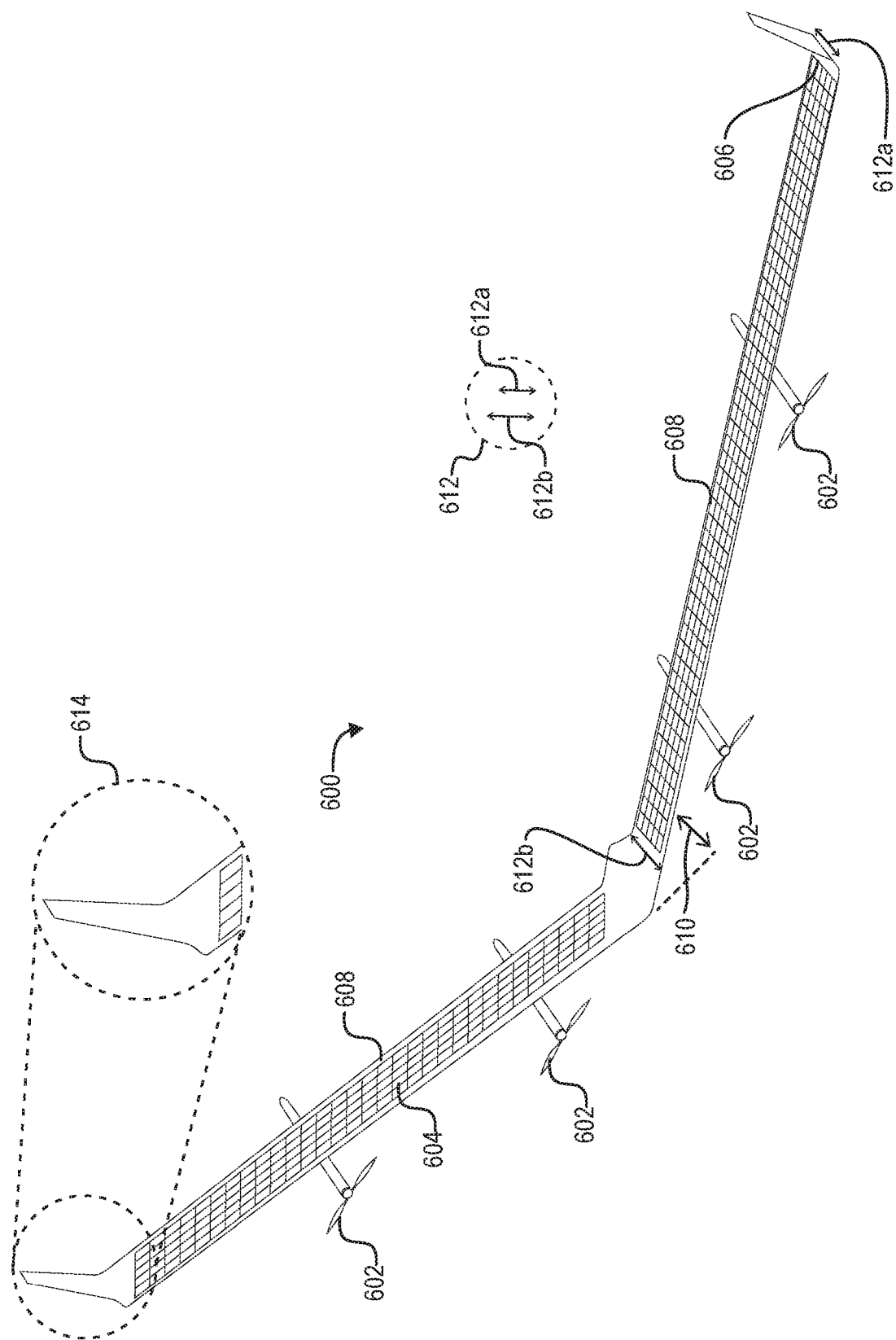
FIG. 6 illustrates a flying-wing aircraft model in accordance with one or more embodiments.

The multi-disciplinary aircraft design system can account for these design issues in generating a flying-wing aircraft model. For example, FIG. 6 illustrates a flying-wing aircraft model 600 in accordance with one or more embodiments of the multi-disciplinary aircraft design system. Similar to the boom aircraft models discussed above, the flying-wing aircraft model 600 also includes a propulsion system 602 (e.g., propellers with battery-powered motors), a wing structure 604, a wing twist 606, ailerons 608, and a taper ratio 612 defined by a tip chord 612a and a root chord 612b. In addition, the flying-wing aircraft model 600 also includes a wing sweep 610 and a winglet 614.

Similar to boom aircraft models, the multi-disciplinary aircraft design system can modify design variables for the flying-wing aircraft model 600 utilizing an optimization algorithm to generate a new flying-wing aircraft model. In one or more embodiments, the multi-disciplinary aircraft design system applies various modifications to account for the unique issues of a flying-wing aircraft. For example, to handle the impact of wing sweep on aerodynamics, longitudinal stability, stresses, and aero-structural modes, the multi-disciplinary aircraft design system can include wing sweep as a design variable directly accessible by an optimization algorithm.

Furthermore, inasmuch as flying-wing aircraft models do not include an empennage, the multi-disciplinary aircraft design system can remove empennage modification from the inner loop 206. Moreover, the multi-disciplinary aircraft design system can add one or more subsystems. For example, in one or more embodiments, the multi-disciplinary aircraft design system adds winglet modification to the inner loop 206. Similarly, the multi-disciplinary aircraft design system can modify battery location (e.g., rather than wing location) to the inner loop 206 to balance the aircraft.

Moreover, in designing flying-wing aircraft, the multi-disciplinary aircraft design system can apply and account for active flutter suppression. For example, in one or more embodiments, the multi-disciplinary aircraft design system applies active flutter suppression and models aeroelastic stability (i.e., modal stability) at a modified velocity to account for the active flutter suppression. Moreover, the multi-disciplinary aircraft design system applies an a modified aeroelastic stability constraint (at the modified velocity).

In addition, in one or more embodiments, the multi-disciplinary aircraft design system determines aerodynamic performance slightly differently for flying-wing aircraft models. Indeed, in relation to flying-wing aircraft models sweep effects on aerodynamic performance impact both lifting surface and drag. In one or more embodiments, the multi-disciplinary aircraft design system first utilizes an aircraft flight modeling algorithm to determine the spanwise induced angle of attack. The multi-disciplinary aircraft design system then identifies the perpendicular-plane sectional lift from the airfoil aero-database (described above) for the local Reynolds number. The multi-disciplinary aircraft design system can determine overall lift from spanwise integration utilizing infinite swept wing theory. Moreover, the multi-disciplinary aircraft design system can obtain drag by the summation of the individually treated pressure drag and friction drag. Further, local friction drag scales with freestream airspeed and the freestream aligned chord, while pressure drag scales with the perpendicular-plane airspeed squared and chord. Additionally, pressure drag is not aligned with the freestream direction resulting in its dependence to the cubic power of the cosine of the sweep angle. Utilizing this approach, the multi-disciplinary aircraft design system can determine aerodynamic performance within an optimization loop for generating flying-wing aircraft models.

Figure 7:
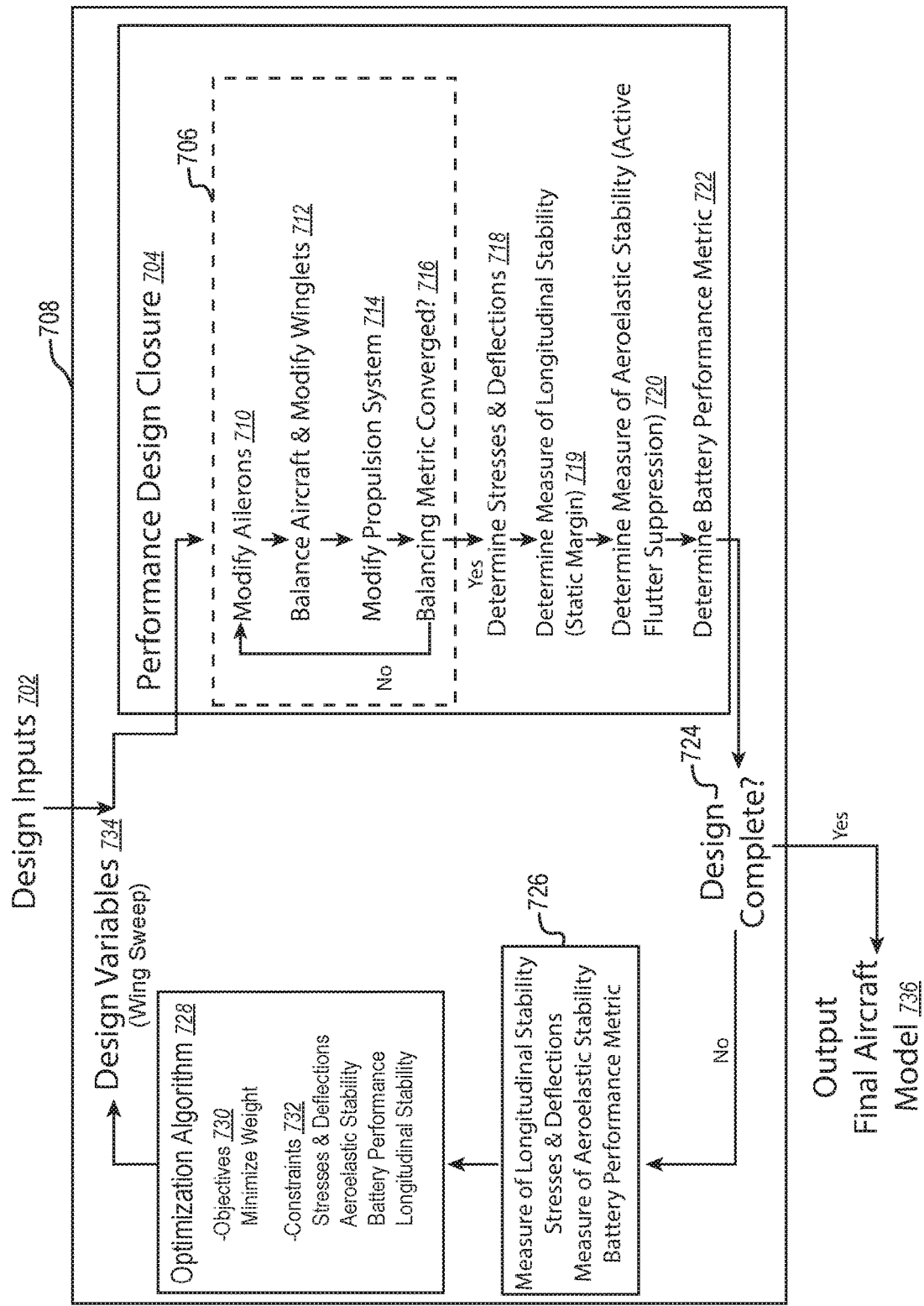
FIG. 7 illustrates a schematic diagram of a multidisciplinary design optimization process for generating a modified flying-wing aircraft model in accordance with one or more embodiments.

For example, FIG. 7 illustrates an optimization loop 708 for generating an output 736 final flying-wing aircraft models in accordance with one or more embodiments. Similar to the boom aircraft models discussed above, the optimization loop 708 identifies design inputs 702 and design variables 734 and provides the design inputs 702 and the design variables 734 to a performance design closure 704. The performance design enclosure 704 includes an inner loop 706 that itself includes an act 710 for modifying ailerons, an act 712 for balancing the aircraft model and modifying winglets, an act 714 for modifying a propulsion system, and an act 716 for determining whether a balancing metric has converged. Moreover, the performance design enclosure also includes an act 718 for determining stresses and deflections, an act 719 for determining a measure of longitudinal stability (static margin), an act 720 for determining a measure of aeroelastic stability, and an act 722 for determining a battery performance metric.

Furthermore, similar to boom aircraft models, upon completion of the performance design closure 704, the multi-disciplinary aircraft design system performs an act 724 of determining whether the aircraft model is complete and performs an act 726 of providing determined measures of longitudinal stability, stresses and deflections, determined measure of aeroelastic stability, and determined battery performance metric to an optimization algorithm 728. The optimization algorithm 728 also modifies the design variables 734 according to an objective 730 and subject to constraints 732.

There are a number of differences, however, between the optimization loop 708 and the optimization loop 208. As an initial matter, the design variables 734 include a wing sweep (e.g., rather than tail volume coefficient). By including wing sweep within the design variables directly accessible to the optimization algorithm 228, the multi-disciplinary aircraft design system can more directly manage design trade-offs particular to the flying-wing configuration.

In addition to including wing sweep in the design variables 734, the optimization loop 708 of FIG. 7 also includes other differences from the optimization loop 208 of FIG. 2. For example, in relation to the embodiment FIG. 7, the multi-disciplinary aircraft design system performs the act 712 of balancing the aircraft model and modifying winglets (rather than the act 212 of modifying an empennage and wing position). Indeed, because flying-wing aircraft models do not include an empennage, the multi-disciplinary aircraft design system does not include modifying an empennage, but rather modifies winglets and battery location as part of the inner loop 706. In particular, the multi-disciplinary aircraft design system can enforce pitch trim of the aircraft model by translating batteries fore and aft. Additional detail regarding the act 712 is provided below in relation to FIGS. 8-9.

In addition to the act 712, the optimization loop 708 also includes other elements distinctive from the optimization loop 208 illustrated in FIG. 2. For example, the act 720 includes determining a measure of aeroelastic stability while considering active flutter suppression. As discussed previously, the body-freedom-flutter instability strongly influences flying-wing aircraft model. Passive means to mitigate this instability by stiffening the structure results in a significant weight increase (which contradicts objectives for minimizing weight). Accordingly, in one or more embodiments, the multi-disciplinary aircraft design system utilizes and accounts for active flutter suppression in generating a flying-wing aircraft model.

The multi-disciplinary aircraft design system can consider and account for a variety of active flutter suppression approaches. For example, the multi-disciplinary aircraft design system can utilize Identically Located Acceleration and Force (ILAF); $H_\infty$ Robust Control; or Modal Isolation and Damping for Adaptive Aeroservoelastic Suppression (MIDAAS).

To incorporate these strategies, in one or more embodiments, the multi-disciplinary aircraft design system extends the flight envelope. In particular, the multi-disciplinary aircraft design system captures the effect of active suppression on modal stability by extending the flight envelope (e.g., limiting the range of analysis within a flight envelope). Indeed, on average the flutter suppression strategies mentioned above extend the flight envelope by 30%. Accordingly, the multi-disciplinary aircraft design system can determine a measure of aeroelastic stability within the flight envelope, up to a predetermined velocity limit (e.g., 76% of $V_{max}$, maximum velocity within the flight envelope). The multi-disciplinary aircraft design system then adds a constraint at the optimization algorithm, such that the constraint requires a minimum measure of aeroelastic stability within the predetermined velocity limit (e.g., up to 76% of $V_{max}$). Active controls are then assumed to extend the stable boundary up to $V_{max}$.

Figure 8:
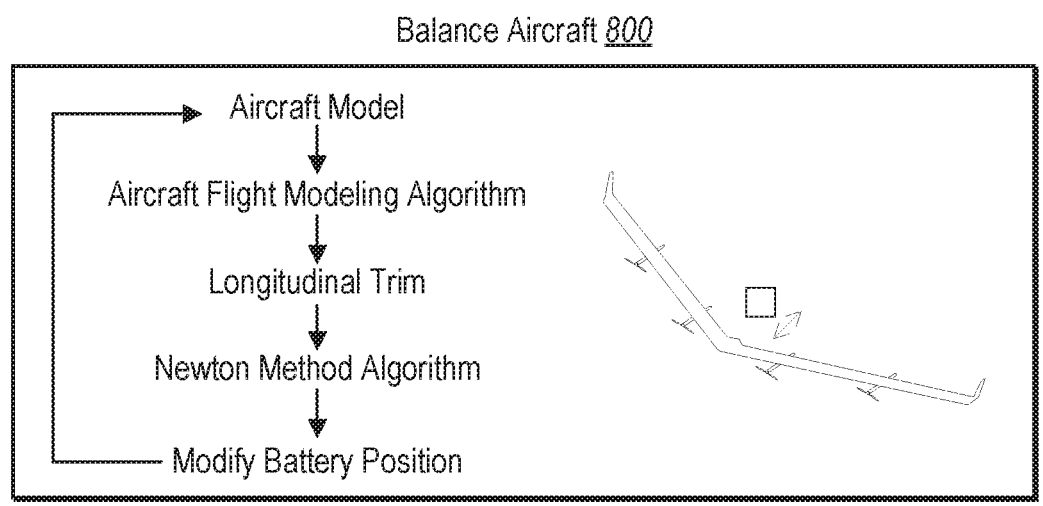
FIG. 8 illustrates a schematic diagram of a process for balancing a flying-wing aircraft model in accordance with one or more embodiments.

As mentioned above, in generating a flying-wing aircraft model, the multi-disciplinary aircraft design system can modify winglets and/or a battery position as part of a longitudinal stability loop. FIG. 8 illustrates additional detail regarding a flying-wing design longitudinal stability loop in accordance with one or more embodiments.

In particular, FIG. 8 illustrates a longitudinal stability loop 800 (e.g., performed as part of the act 712 of balancing the aircraft and sizing winglets). The multi-disciplinary aircraft design system provides the aircraft model to the aircraft flight modeling algorithm which determines a measure of longitudinal trim. For example, the aircraft flight modeling algorithm can generate a measure of pitch trim. The multi-disciplinary aircraft design system can then provide the measure of longitudinal trim to a newton method algorithm. The newton method algorithm can search for a root of a function that reflects satisfaction of a longitudinal trim condition (e.g., cruise pitch trim at zero control surface deflection). In particular, the newton method can generate a modified battery position (e.g., move the battery in a chord-wise direction) to satisfy the pitch trim condition.

As illustrated, the multi-disciplinary aircraft design system can update the aircraft model based on the modified battery position. Moreover, the multi-disciplinary aircraft design system can provide the updated aircraft model (with the modified battery position) to the aircraft flight modeling algorithm to determine a new measure of longitudinal trim. The multi-disciplinary aircraft design system can iteratively repeat the longitudinal stability loop 800 until convergence.

Although not illustrated in FIG. 8, the multi-disciplinary aircraft design system can also provide a measure of longitudinal stability from the longitudinal stability loop 800 to an optimization algorithm. Similar to the embodiment of FIG. 4, in one or more embodiments, the multi-disciplinary aircraft design system provides pitching moment coefficient (e.g., at an angle of attack) to an optimization algorithm to allow the optimization algorithm to directly consider longitudinal stability in modifying design variables.

As just discussed, the multi-disciplinary aircraft design system can utilize a longitudinal stability loop for boom aircraft models and flying-wing aircraft models. For example, FIG. 9 illustrates a direct comparison between a longitudinal stability loop implemented for a boom aircraft model and a longitudinal stability implemented for a flying-wing aircraft model in accordance with one or more embodiments of the multi-disciplinary aircraft design system.

Figure 9:
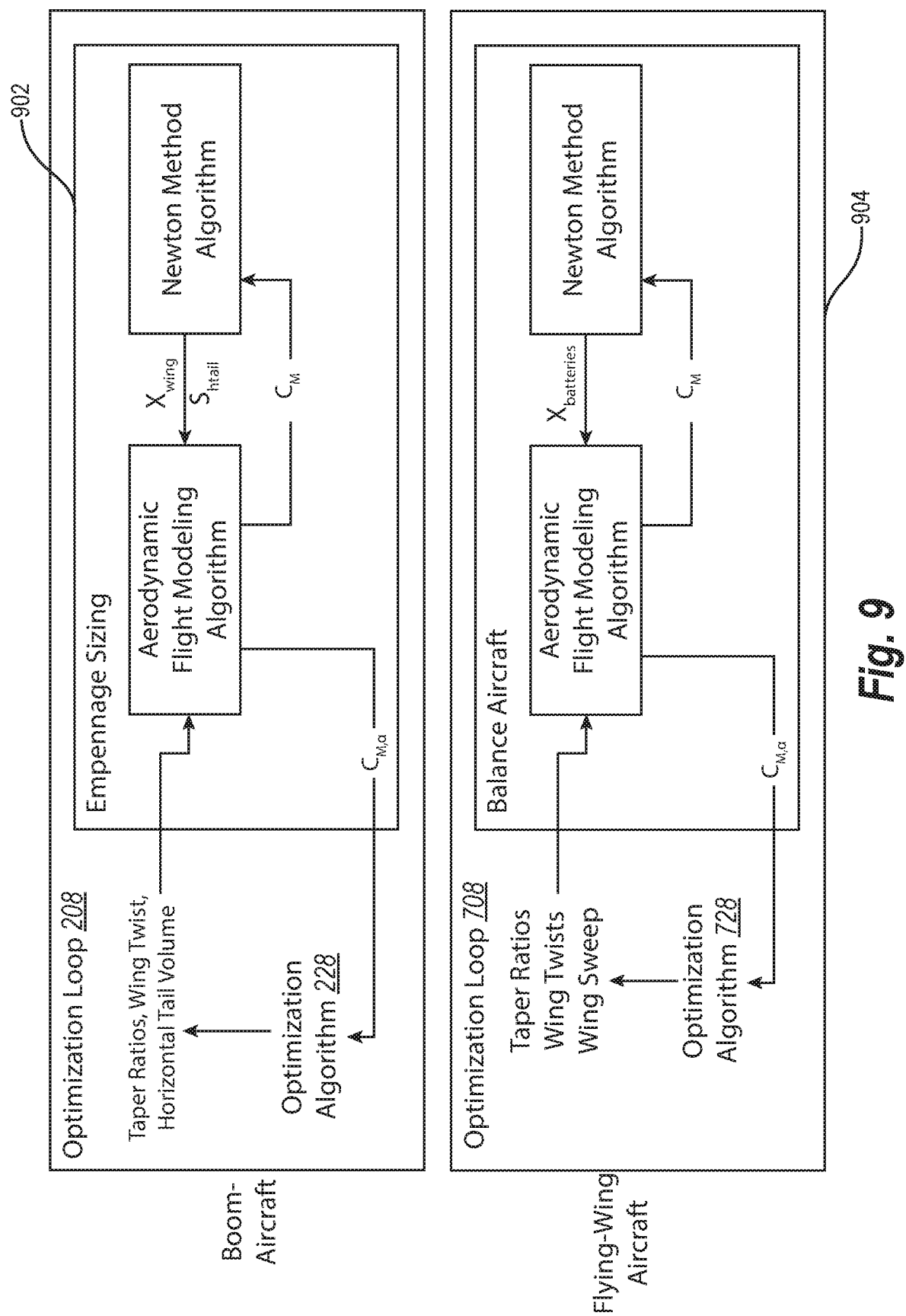
FIG. 9 illustrates schematic diagrams comparing a longitudinal stability loop for generating a boom aircraft model and a longitudinal stability loop for a flying-wing aircraft model in accordance with one or more embodiments.

In particular, FIG. 9 illustrates a longitudinal stability loop 902 for a boom aircraft (e.g., as part of the optimization loop 208). The longitudinal stability loop 902 is employed as part of empennage sizing (e.g., at the act 212 from FIG. 2). As shown, the multi-disciplinary aircraft design system provides design variables for an aircraft model (i.e., taper ratios, wing twists, and horizontal tail volume coefficient) to the longitudinal stability loop 902. The aerodynamic flight modeling algorithm analyzes the aircraft model (including the taper ratios and wing twists) and determines $C_m$, a pitching moment coefficient and $C_{m\alpha}$, a pitching moment coefficient for values of angle of attack. The multi-disciplinary aircraft design system provides the pitching moment coefficient to a newton method algorithm (or quasi-newton method algorithm), which determines $X_{wing}$, a modified wing position, and $S_{initial}$, a modified horizontal tail area size. The multi-disciplinary aircraft design system then iteratively repeats until convergence. Thus, the longitudinal stability loop 902 directly sizes the horizontal tail area and positions the wing to satisfy longitudinal stability criteria (e.g., pitch trim configuration and horizontal tail volume coefficient criteria).

As shown, the multi-disciplinary aircraft design system provides the pitching moment coefficient for values of angles of attack to the optimization algorithm 228. Accordingly, the optimization algorithm 228 can consider this value in selecting design variables.

FIG. 9 also illustrates a longitudinal stability loop 904 for a flying-wing aircraft model (e.g., as part of the optimization loop 708). As shown, the multi-disciplinary aircraft design system provides design variables for the flying-wing aircraft model (e.g., taper ratios, wing twists, and wing sweep) to the longitudinal stability loop 904. The aerodynamic flight modeling algorithm analyzes the flying-wing aircraft model (including the taper ratios, wing twists, and wing sweep) and determines $C_m$, a pitching moment coefficient, and $C_{m\alpha}$, a pitching moment coefficient for values of angle of attack. The multi-disciplinary aircraft design system provides the pitching moment coefficient to the newton method algorithm (or quasi-newton method algorithm) to generate a modified battery position. Specifically, the multi-disciplinary aircraft design system utilizes the newton method algorithm to estimate a modified battery position corresponding to cruise pitch trim at zero control surface deflection (while capturing structural deflection under load). The multi-disciplinary aircraft design system then provides the modified battery position to the aerodynamic flight modeling algorithm and repeats until convergence. As shown, the multi-disciplinary aircraft design system, in relation to the longitudinal stability loop 904, also provides $C_{m\alpha}$ to the optimization algorithm 728.

Although the longitudinal stability loop 904 illustrates modifying a battery location (i.e., $X_{batteries}$) it does not illustrate modifying winglet size. In one or more embodiments, the multi-disciplinary aircraft design system also modifies winglet size as part of the longitudinal stability loop 904.

Figure 10:
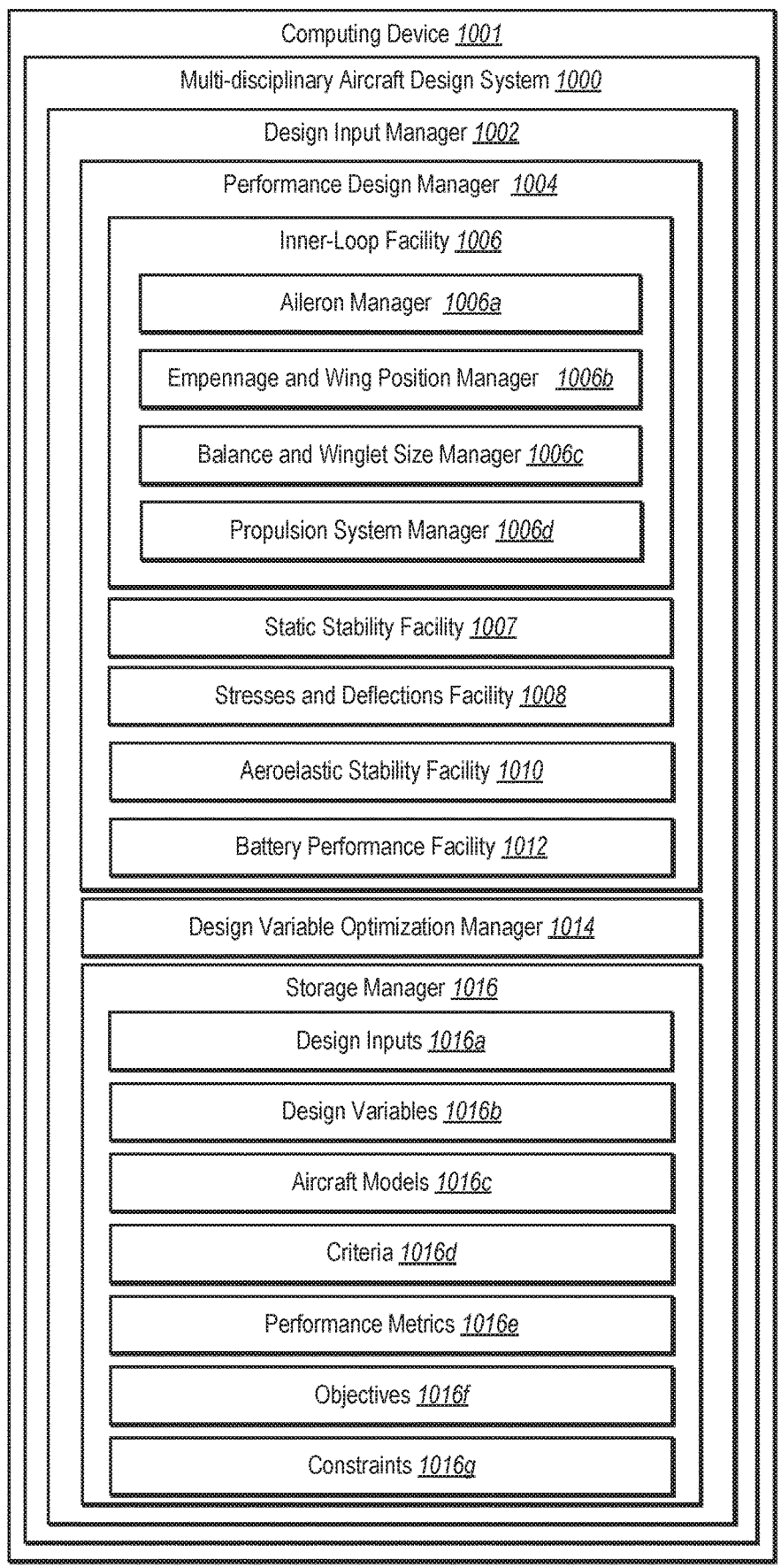
FIG. 10 illustrates an exemplary architecture of a multi-disciplinary aircraft design system in accordance with one or more embodiments.

Turning now to FIG. 10, additional detail will be provided regarding various components and capabilities of the multi-disciplinary aircraft design system. In particular, FIG. 10 illustrates a multi-disciplinary aircraft design system 1000 (i.e., an exemplary embodiment of the multi-disciplinary aircraft design system discussed above) implemented by a computing device 1001 (e.g., a client device and/or server device as discussed below in relation to FIGS. 11, 13). As shown, the multi-disciplinary aircraft design system 1000 may include, but is not limited to, a design input manager 1002, a performance design manager 1004 (which includes an inner loop facility 1006 with an aileron manager 1006a, an empennage and wing position manager 1006b, a balance and winglet size manager 1006c, and a propulsion system manager 1006d), a static stability facility 1007, a stresses and deflections facility 1008, an aeroelastic stability facility 1010, a battery performance facility 1012, a design variable optimization manager 1014, and a storage manager 1016 (comprising design inputs 1016a, design variables 1016b, aircraft models 1016c, criteria 1016d, performance metrics 1016e, objectives 1016f, and constraints 1016g).

As just mentioned, and as illustrated in FIG. 10, the multi-disciplinary aircraft design system 1000 includes the design input manager 1002. The design input manager can identify, collect, receive, and/or generate design inputs. For example, as discussed above, the multi-disciplinary aircraft design system can identify (e.g., via user input) mission information, payload, winds, or material properties.

As shown in FIG. 10, the multi-disciplinary aircraft design system 1000 also includes the performance design manager 1004. The performance design manager 1004 can implement a performance design enclosure as described above. For instance, the performance design manager can analyze structural performance, aerodynamic performance, and battery performance while iteratively modifying subsystems of an aircraft model.

For instance, as shown in FIG. 10, the performance design manager 1004 includes an inner loop facility 1006. The inner loop facility 1006 can iteratively modify ailerons (via the aileron manager 1006) empennage and wing position (e.g., via the empennage and wing position manager 1006b), battery position and winglet size (e.g., via the balance and winglet size manager 1006c), and/or a propulsion system (e.g., via the propulsion system manager 1006d), as described above.

In addition, as explained above, the empennage and wing position manager 1006b can also include a longitudinal stability loop for iteratively modifying empennage size and wing position (e.g., utilizing ASWING and a newton method algorithm). Moreover, the balance and winglet size manager 1006c can also include a longitudinal stability loop for iteratively modifying battery position (e.g., utilizing ASWING and a newton method algorithm).

Furthermore, as discussed above, the inner loop facility 1006 can also identify, generate, and/or determine a balancing metric (e.g., center of gravity, subsystem weight, and/or battery weight), a flight envelope (e.g., a V-n diagram), or aerodynamic performance of an aircraft model. Moreover, the inner loop facility 1006 can determine whether the inner loop has converged (e.g., by determining that the balancing metric or some other metric has converged or that a particular number of iterations have been performed).

Moreover, as illustrated in FIG. 10, the multi-disciplinary aircraft design system 1000 also includes the static stability facility 1007. The static stability facility 1007 can determine one or more measures of longitudinal stability. In particular, the static stability facility 1007 can determine static margin of an aircraft model.

As shown in FIG. 10, the multi-disciplinary aircraft design system 1000 also includes the stresses and deflections facility 1008. The stresses and deflections facility 1008 can determine, generate, identify and/or calculate stresses and deflections of an aircraft model (including moments, torques, or angular stresses and rotations, twists, or angular deformations). As described above, stresses and deflections facility 1008 can utilize a structural analysis algorithm and/or aircraft flight modeling algorithm to determine performance loads for an aircraft model and stresses and deflections of the aircraft model corresponding to the performance loads.

In addition, as illustrated in FIG. 10, the multi-disciplinary aircraft design system 1000 also includes an aeroelastic stability facility 1010. The aeroelastic stability facility 1010 can determine, generate, identify, and/or calculate a measure of aeroelastic stability for an aircraft model. For example, as described above, the aeroelastic stability facility 1010 can model an aircraft model throughout a flight envelope (e.g., at different speeds, altitudes, and/or loads), determine oscillation instability modes, and determine a measure of aeroelastic stability (e.g., flutter and/or damping) for one or more oscillation instability modes (e.g., the worst case oscillation instability modes).

Moreover, as shown in FIG. 10, the multi-disciplinary aircraft design system 1000 also includes a battery performance facility 1012. The battery performance facility 1012 can determine, generate, identify, and/or calculate a battery performance metric for an aircraft model. For example, as described above, the battery performance facility 1012 can simulate performance of an aircraft model through a mission test and determine a remaining battery charge at the conclusion of the mission test (e.g., at the conclusion of a flight spanning the shortest day of the year at a particular location).

Furthermore, as illustrated in FIG. 10, the multi-disciplinary aircraft design system 1000 also includes the design variable optimization manager 1014. The design variable optimization manager 1014 can modify, change, optimize, select, determine, or generate design variables for an aircraft model. In particular, the design variable optimization manager 1014 can modify design variables in pursuit of one or more objectives and/or subject to one or more constraints. For example, as described above, in one or more embodiments, the design variable optimization manager 1014 modifies design variables to explore a design space in order to minimize aircraft model weight, while staying within aeroelastic stability constraints, stress and deflection constraints, battery performance constraints, and/or longitudinal stability constraints.

As shown in FIG. 10, the multi-disciplinary aircraft design system 1000 may also contain a storage manager 1016. The storage manager 1016 maintains data for the multi-disciplinary aircraft design system 1000. The storage manager 1016 can maintain data of any type, size, or kind, as necessary to perform the functions of the multi-disciplinary aircraft design system 1000. As shown, the storage manager 1016 includes design inputs 1016*a* (e.g., mission information or material properties), design variables 1016*b* (e.g., taper ratio, wing twist, or wing sweep), aircraft models 1016*c* (e.g., design inputs and design variables corresponding to components of the aircraft model), criteria 1016*d* (e.g., steady-roll state criteria for ailerons, longitudinal stability criteria such as pitch trim and static margin criteria, or propulsion criteria), performance metrics 1016*e* (e.g., stresses and deflections, measures of aeroelastic stability, battery performance metrics, or measures of longitudinal stability), objectives 1016*f* (e.g., minimize weight or maximize battery performance), and constraints 1016*g* (e.g., stress and/or deflection constraints, aeroelastic stability constraints such as damping, battery performance constraints, or longitudinal stability constraints such as a static margin inequality constraint).

Each of the components 1002-1016 of the multi-disciplinary aircraft design system and their corresponding elements may be in communication with one another using any suitable communication technologies. It will be recognized that although components 1002-1016 and their corresponding elements are shown to be separate in FIG. 10, any of components 1002-1016 and their corresponding elements may be combined into fewer components, such as into a single facility or module, divided into more components, or configured into different components as may serve a particular embodiment.

The components 1002-1016 and their corresponding elements can comprise software, hardware, or both. For example, the components 1002-1016 and their corresponding elements can comprise one or more instructions stored on a computer-readable storage medium and executable by processors of one or more computing devices. The components 1002-1016 and their corresponding elements can comprise hardware, such as a special purpose processing device to perform a certain function or group of functions. Additionally, or alternatively, the components 1002-1016 and their corresponding elements can comprise a combination of computer-executable instructions and hardware.

Furthermore, the components 1002-1016 of the multi-disciplinary aircraft design system 1000 may, for example, be implemented as one or more stand-alone applications, as one or more modules of an application, as one or more plug-ins, as one or more library functions or functions that may be called by other applications, and/or as a cloud-computing model. Thus, the components 1002-1016 of the multi-disciplinary aircraft design system 1000 may be implemented as a stand-alone application, such as a desktop or mobile application. Furthermore, the components 1002-1016 of the multi-disciplinary aircraft design system 1000 may be implemented as one or more web-based applications hosted on a remote server. Alternatively, or additionally, the components of the multi-disciplinary aircraft design system 1000 may be implemented in a suit of mobile device applications or "apps."

Figure 11:
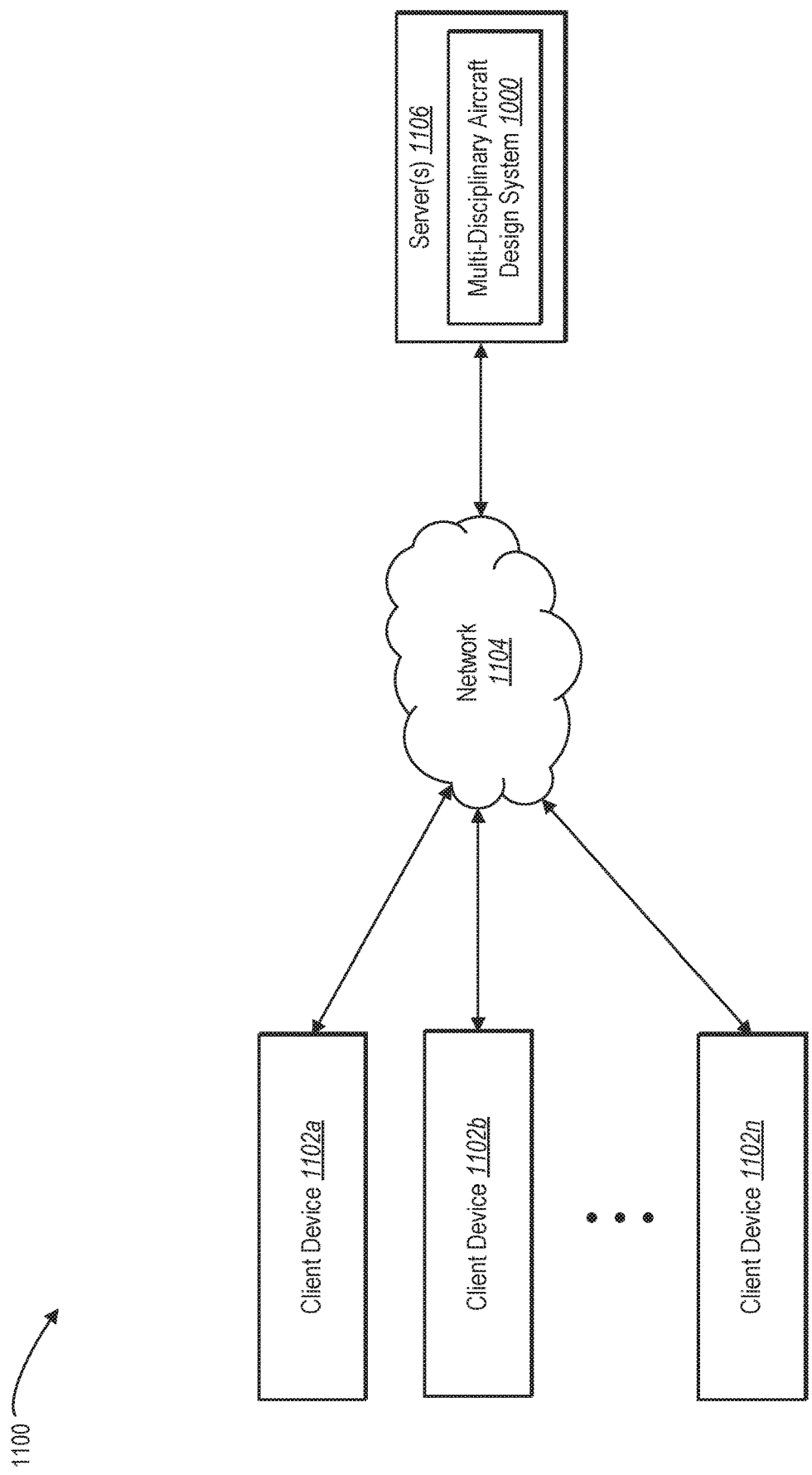
FIG. 11 illustrates an example environment in which the multi-disciplinary aircraft design system can operate in accordance with one or more embodiments.

Turning now to FIG. 11, further information will be provided regarding implementation of the multi-disciplinary aircraft design system 1000. Specifically, FIG. 11 illustrates a schematic diagram of one or more embodiments of an exemplary system environment ("environment") 1100 in which the multi-disciplinary aircraft design system 1000 can operate. As illustrated in FIG. 11, the environment 1100 can include client devices 1102*a*-1102*n*, a network 1104, and server(s) 1106.

The client devices 1102*a*-1102*n*, the network 1104, and the server(s) 1106 may be communicatively coupled with each other either directly or indirectly (e.g., through the network 1104, discussed in greater detail below in relation to FIG. 13). Moreover, the client devices 1102*a*-1102*n* and server(s) 1106 may comprise any type of computing device (including one or more computing devices as discussed in greater detail below in relation to FIG. 13).

As just mentioned, the environment 1100 also includes the server(s) 1106. The server(s) 1106 may generate, store, receive, and/or transmit any type of data, including design inputs 1016*a*, design variables 1016*b*, aircraft models 1016*c*, criteria 1016*d*, performance metrics 1016*e*, objectives 1016*f*, and constraints 1016*g*. For example, the server(s) 1106 may receive data from the client device 1102*a* and send the data to the client device 1102*b*. In one or more embodiments, the server(s) 1106 may comprise a data server. The server(s) 1106 can also comprise a communication server or a web-hosting server.

Although FIG. 11 illustrates a particular number of client devices, it will be appreciated that the environment 1100 can include any number of computing devices (fewer or greater than shown). Similarly, although FIG. 11 illustrates a particular arrangement of the client devices 1102*a*-1102*n*, the network 1104, and the server(s) 1106, various additional arrangements are possible.

By way of example, in one or more embodiments, the client device 1102*a* sends a request to the server(s) 1106 to generate an aircraft model. The client device 1102*a* can provide to the server(s) 1106 one or more design inputs (e.g., based on user selection). The multi-disciplinary aircraft design system 1000 can then utilize the server(s) 1106 to generate a new aircraft model based on the design inputs.

For example, server(s) 1106 can determine initial design variables (e.g., randomly generate values or values from another aircraft design). Moreover, the server(s) 1106 can (based on the initial design variables and design inputs) iteratively modify ailerons, an empennage, winglets, and/or a propulsion system of an aircraft model until convergence. The server(s) 1106 can determine structural, aeroelastic stability, and energy performance metrics for the aircraft model (with the modified ailerons, empennage, winglets, and/or propulsion system). Moreover, the server(s) 1106 can apply an optimization algorithm based on the determined structural, aeroelastic stability, and energy performance metrics to modify the design variables. In particular, the server(s) 1106 can apply an optimization algorithm to modify design variables to obtain one or more objectives subject to one or more constraints. The multi-disciplinary aircraft design system can repeatedly perform this optimization process until a new aircraft model converges. The server(s) 1106 can then provide the new aircraft model to the client device 1102*a* via the network 1104.

As illustrated by the previous example embodiments, the multi-disciplinary aircraft design system 1000 may be implemented in whole, or in part, by the individual elements 1102*a*-1106 of the environment 1100. Although FIG. 11 illustrates the multi-disciplinary aircraft design system 1000 implemented with regard to the server(s) 1106, it will be appreciated that components of the multi-disciplinary aircraft design system 1000 can be implemented in any of the components of the environment 1100. For example, in one or more embodiments, the design input manager 1002, the performance design manager 1004, the inner loop facility 1006, and the design variable optimization manager 1014 are implemented on the client device 1102*a*.

Figure 12:
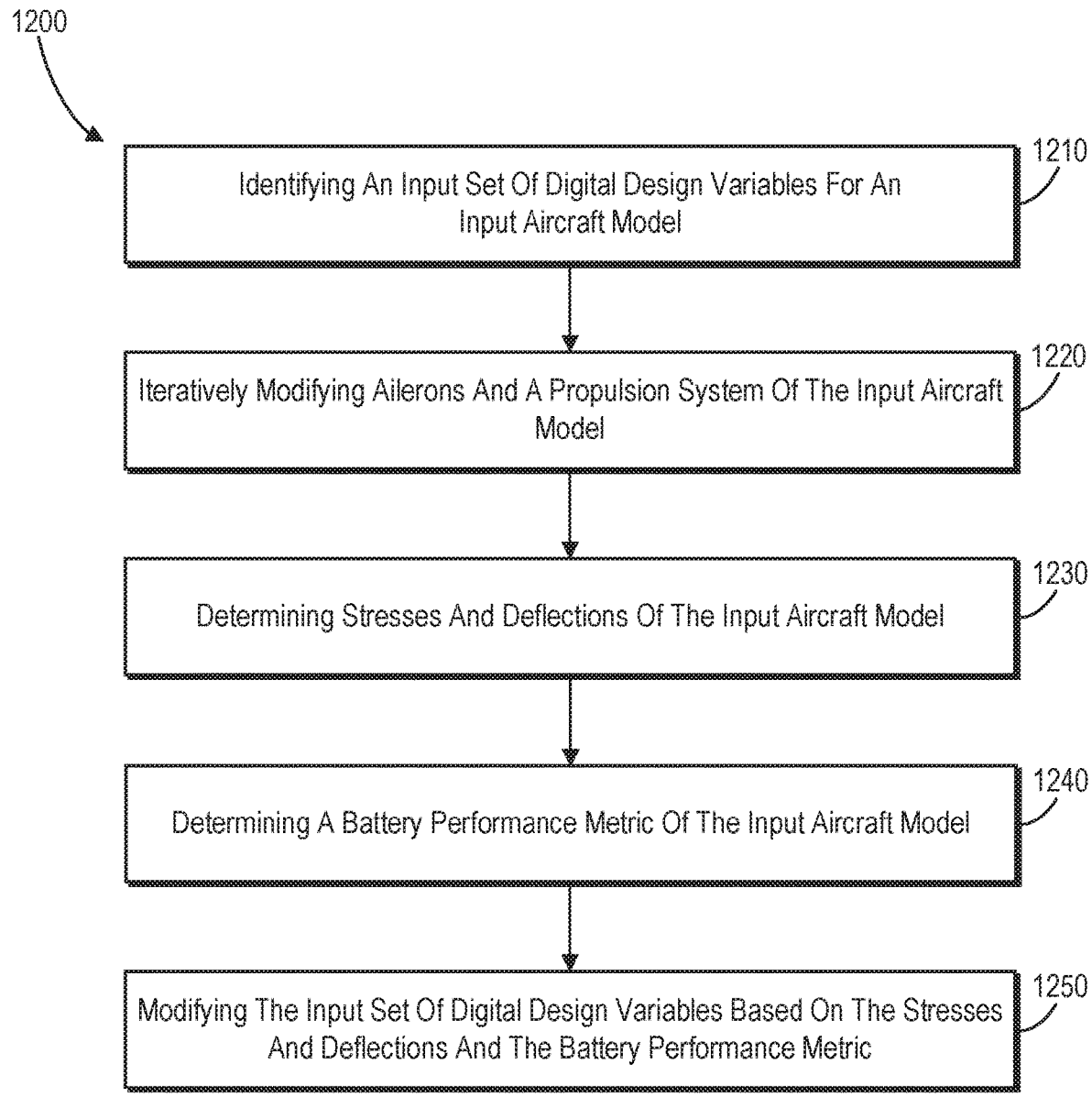
FIG. 12 illustrates a flowchart of a series of acts for generating an aircraft model in accordance with one or more embodiments.

Turning now to FIG. 12, this figure illustrates a flowchart of a series of acts 1200 of generating an aircraft model in accordance with one or more embodiments. While FIG. 12 illustrates acts according to one or more embodiments, alternative embodiments may omit, add to, reorder, and/or modify any of the acts shown in FIG. 12. The acts of FIG. 12 can be performed as part of a method. Alternatively, a non-transitory computer readable medium can comprise instructions, that when executed by one or more processors, cause a computing device to perform the acts of FIG. 12. In still further embodiments, a system can perform the acts of FIG. 12.

As shown, the series of acts 1200 includes an act 1210 of identifying an input set of quantitative design variables for an input aircraft model. In particular, the act 1210 can include identifying an input set of quantitative design variables of an input aircraft model, wherein the input aircraft model comprises ailerons and a propulsion system.

In addition, as shown in FIG. 12, the series of acts 1200 also includes an act 1220 of iteratively modifying ailerons and a propulsion system of the input aircraft model. In particular, the act 1220 can include, based on the set of quantitative design variables, iteratively modifying the ailerons and the propulsion system of the input aircraft model based on performance criteria until a balancing metric of the input aircraft model converges.

Moreover, as illustrated in FIG. 12, the series of acts 1200 also includes an act 1230 of determining stresses and deflections of the input aircraft model. In particular, the act 1230 includes determining stresses and deflections of the input aircraft model with the modified ailerons and the modified propulsion system under performance loads.

As shown in FIG. 12, the series of acts 1200 also includes an act 1240 of determining a battery performance metric of the input aircraft model. In particular, the act 1240 can include determining stresses and deflections of the input aircraft model with the modified ailerons and the modified propulsion system under performance loads.

As illustrated in FIG. 12, the series of acts 1200 also includes an act 1250 of modifying the input set of quantitative design variables based on the stresses and deflections and the battery performance metric. In particular, the act 1240 can include generating a modified aircraft model by modifying the input set of quantitative design variables of the input aircraft model based on the determined stresses and deflections of the input aircraft model with the modified ailerons and the modified propulsion system under the performance loads and based on the determined battery performance metric of the input aircraft model with the modified ailerons and the modified propulsion system in relation to the test mission.

As mentioned, the sequence of acts 1200 can include analyzing structural performance, aerodynamic performance, and battery performance of the input aircraft model. For example, the sequence of acts can analyze structural performance, aerodynamic performance, and battery performance by performing the acts 1220, 1230, and 1240.

In one or more embodiments, the sequence of acts 1200 also includes determining a measure of aeroelastic stability of the input aircraft model with the modified ailerons and the modified propulsion system through a flight envelope by modeling damping of the input aircraft model with respect to an oscillation instability mode. Moreover, the sequence of acts 1200 can also include modifying the input set of quantitative design variables of the input aircraft model based on the determined measure of aeroelastic stability of the input aircraft model with the modified ailerons and the modified propulsion system.

For instance, the act 1250 can include providing as input to an optimization algorithm having one or more objectives and one or more constraints: the determined stresses and deflections of the input aircraft model with the modified ailerons and the modified propulsion system under the performance loads, the determined battery performance metric of the input aircraft model with the modified ailerons and the modified propulsion system in relation to the test mission, and the determined aeroelastic stability of the input aircraft model with the modified ailerons and the modified propulsion system; and utilizing the optimization algorithm to modify the quantitative design variables according to the one or more objectives and the one or more constraints, wherein the one or more objectives comprise improving the modified battery performance metric and reducing a weight of the aircraft and wherein the one or more constraints comprise an aeroelastic stability constraint.

Furthermore, the sequence of acts 1200 can also include based on the modified set of quantitative design variables of the modified aircraft model, iteratively revising the modified ailerons and the modified propulsion system based on performance criteria until a revised balancing metric of the modified aircraft model converges.

In one or more embodiments, the input aircraft model is a boom aircraft model comprising an empennage and the sequence of acts 1200 further comprises iteratively and jointly modifying the empennage with the ailerons and the propulsion system of the input aircraft model based on the performance criteria until the balancing metric of the input aircraft model converges.

For instance, iteratively and jointly modifying the empennage with the ailerons and the propulsion system of the input aircraft model can include: generating a modified aileron size for the ailerons based on a steady roll-rate; generating a modified empennage size by: determining a horizontal tail area of the empennage based on a longitudinal stability criteria; and determining a vertical tail area of the empennage based on a yaw performance case; and generating a modified propulsion system size based on propulsion criteria.

In addition, in one or more embodiments, the sequence of acts 1200 further includes determining the balancing metric of the input aircraft model based on the modified empennage size and the modified propulsion system size. Moreover, in one or more embodiments, the balancing metric of the input aircraft model comprises one or more of: a center of gravity of the input aircraft model or a weight of a battery of the input aircraft model for powering the propulsion system. Further, in some embodiments, the input set of quantitative design variables comprises one or more of: a taper ratio, a wing twist, or a wing structure.

In one or more embodiments of the sequence of acts 1200, the input aircraft model is a flying-wing aircraft model, and the sequence of acts 1200 further includes providing a measure of longitudinal stability as input to the optimization algorithm. Moreover, in some embodiments, the one or more constraints of the optimization algorithm comprise a longitudinal stability constraint. Further, in some embodiments where the input aircraft model is a flying-wing aircraft model, the set of design variables comprises a wing sweep.

In addition, in one or more embodiments, the flying-wing aircraft model comprises a winglet and a battery having a battery position. Further, the sequence of acts 1200 includes iteratively and jointly modifying the ailerons with the winglet, the battery position, and the propulsion system of the input aircraft model until the balancing metric of the input aircraft model converges.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
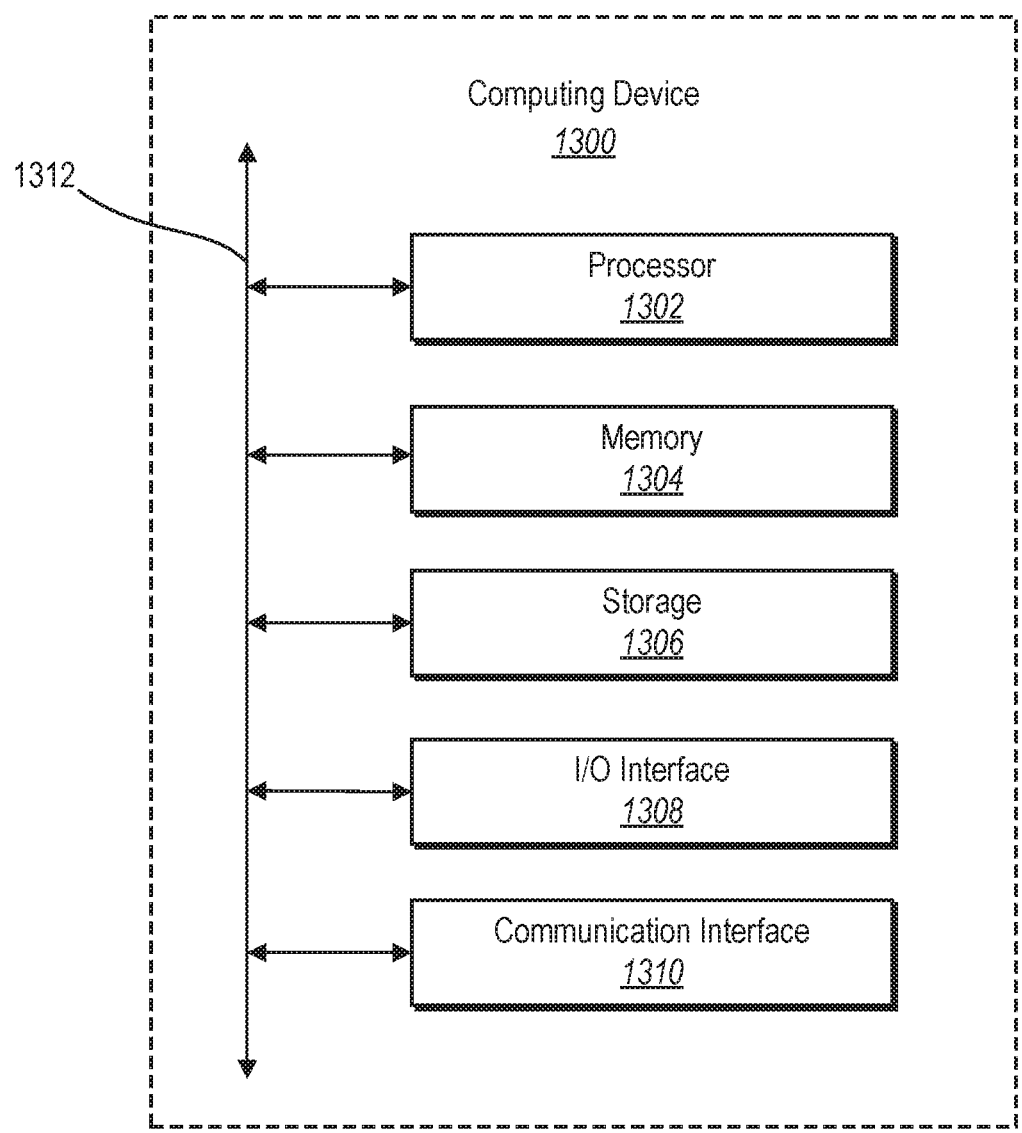
FIG. 13 illustrates a block diagram of a computing device in accordance with one or more embodiments.

FIG. 13 illustrates a block diagram of exemplary computing device 1300 that may be configured to perform one or more of the processes described above. One will appreciate that one or more computing devices such as the computing device 1300 may implement one or more components of the multi-disciplinary aircraft design system 1000. As shown by FIG. 13, the computing device 1300 can comprise a processor 1302, a memory 1304, a storage device 1306, an I/O interface 1308, and a communication interface 1310, which may be communicatively coupled by way of a communication infrastructure 1312. While an exemplary computing device 1300 is shown in FIG. 13, the components illustrated in FIG. 13 are not intended to be limiting. Additional or alternative components may be used in other embodiments. Furthermore, in certain embodiments, the computing device 1300 can include fewer components than those shown in FIG. 13. Components of the computing device 1300 shown in FIG. 13 will now be described in additional detail.

In one or more embodiments, the processor 1302 includes hardware for executing instructions, such as those making up a computer program. As an example and not by way of limitation, to execute instructions, the processor 1302 may retrieve (or fetch) the instructions from an internal register, an internal cache, the memory 1304, or the storage device 1306 and decode and execute them. In one or more embodiments, the processor 1302 may include one or more internal caches for data, instructions, or addresses. As an example and not by way of limitation, the processor 1302 may include one or more instruction caches, one or more data caches, and one or more translation lookaside buffers (TLBs). Instructions in the instruction caches may be copies of instructions in the memory 1304 or the storage device 1306.

The memory 1304 may be used for storing data, metadata, and programs for execution by the processor(s). The memory 1304 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1304 may be internal or distributed memory.

The storage device 1306 includes storage for storing data or instructions. As an example and not by way of limitation, storage device 1306 can comprise a non-transitory storage medium described above. The storage device 1306 may include a hard disk drive (HDD), a floppy disk drive, flash memory, an optical disc, a magneto-optical disc, magnetic tape, or a Universal Serial Bus (USB) drive or a combination of two or more of these. The storage device 1306 may include removable or non-removable (or fixed) media, where appropriate. The storage device 1306 may be internal or external to the computing device 1300. In one or more embodiments, the storage device 1306 is non-volatile, solid-state memory. In other embodiments, the storage device 1306 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 1308 allows a user to provide input to, receive output from, and otherwise transfer data to and receive data from computing device 1300. The I/O interface 1308 may include a mouse, a keypad or a keyboard, a touch screen, a camera, an optical scanner, network interface, modem, other known I/O devices or a combination of such I/O interfaces. The I/O interface 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1308 is configured to provide graphical data to a display for presentation to a user. The graphical data may be representative of one or more graphical user interfaces and/or any other graphical content as may serve a particular implementation.

The communication interface 1310 can include hardware, software, or both. In any event, the communication interface 1310 can provide one or more interfaces for communication (such as, for example, packet-based communication) between the computing device 1300 and one or more other computing devices or networks. As an example and not by way of limitation, the communication interface 1310 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 1310 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 1310 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 1310 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1312 may include hardware, software, or both that couples components of the computing device 1300 to each other. As an example and not by way of limitation, the communication infrastructure 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

We claim:

1. A method comprising:
    identifying an input set of quantitative design variables of an input aircraft model, wherein the input aircraft model comprises ailerons, an empennage, and a propulsion system and the quantitative design variables comprise a taper ratio, a wing twist, and a wing structure;
    analyzing, by at least one processor, structural performance, aerodynamic performance, and battery performance of the input aircraft model utilizing an iterative performance design algorithm by:
        based on the input set of quantitative design variables including the taper ratio, the wing twist, and the wing structure,
            iteratively modifying the ailerons based on a steady roll-state,
            iteratively modifying the empennage by, for each iteration, iteratively modifying a wing position and horizontal tail area size of the empennage based on a pitching moment coefficient to determine pitching moment coefficients for values of angle of attack, and
            iteratively modifying the propulsion system of the input aircraft model based on propulsion criteria
        until a balancing metric of the input aircraft model converges, wherein the balancing metric of the input aircraft model comprises one or more of: a center of gravity of the input aircraft model or a weight of a battery of the input aircraft model for powering the propulsion system;
        in response to the balancing metric of the input aircraft model converging, determining stresses and deflections of the input aircraft model with the modified ailerons, the modified empennage, and the modified propulsion system under performance loads; and
        upon determining the stresses and deflections, determining a battery performance metric of the input aircraft model with the modified ailerons and the modified propulsion system in relation to a test mission; and
    upon determining the battery performance metric, modifying the input set of quantitative design variables comprising the taper ratio, the wing twist, and the wing structure by jointly applying an optimization algorithm to the pitching moment coefficients for values of angle of attack, the stresses and deflections of the input aircraft model, and the battery performance metric to generate a modified aircraft model.

2. The method of claim 1, wherein utilizing the iterative performance design algorithm further comprises determining a measure of aeroelastic stability of the input aircraft model with the modified ailerons and the modified propulsion system through a flight envelope by modeling damping of the input aircraft model with respect to an oscillation instability mode.

3. The method of claim 2, further comprising modifying the input set of quantitative design variables comprising the taper ratio, the wing twist, and the wing structure to generate the modified aircraft model by additionally utilizing the optimization algorithm to process the measure of aeroelastic stability of the input aircraft model determined utilizing the iterative performance design algorithm.

4. The method of claim 2, wherein generating the modified aircraft model further comprises:
    utilizing the optimization algorithm to modify the quantitative design variables comprising the taper ratio, the wing twist, and the wing structure according to one or more objectives and one or more constraints based on:
        the determined stresses and deflections of the input aircraft model with the modified ailerons and the modified propulsion system under the performance loads,
        the determined battery performance metric of the input aircraft model with the modified ailerons and the modified propulsion system in relation to the test mission, and
        and the determined measure of aeroelastic stability of the input aircraft model with the modified ailerons and the modified propulsion system,
    wherein the one or more objectives comprise reducing aircraft weight and wherein the one or more constraints comprise an aeroelastic stability constraint.

5. The method of claim 4, further comprising,
    based on the modified input set of quantitative design variables of the modified aircraft model, iteratively revising the modified ailerons based on the steady roll-state, iteratively revising the modified empennage by, for each revision, iteratively revising the wing position and horizontal tail area size of the empennage based on a picturing moment coefficient to determine additional pitching moment coefficients for values of angle of attack, and iteratively revising the modified propulsion system based on the propulsion criteria until a revised balancing metric of the modified aircraft model converges.

6. The method of claim 1, wherein
the input aircraft model is a boom aircraft model comprising the empennage.

7. The method of claim 1, wherein iteratively
modifying the empennage further comprises, for each iteration:
modifying the horizontal tail area of the empennage further based on a horizontal tail area coefficient; and
modifying a vertical tail area of the empennage based on a yaw performance case.

8. The method of claim 6,
further comprising determining the balancing metric of the input aircraft model based on the modified empennage and the modified propulsion system.

9. The method of claim 4, wherein one or more constraints of the optimization algorithm further comprises a stresses and deflections constraint and a battery state of charge constraint.

10. A non-transitory computer-readable medium storing instructions thereon that, when executed by at least one processor, cause a computer system to:
identify an input set of quantitative design variables of an input aircraft model, wherein the input aircraft model comprises ailerons, an empennage or a winglet, and a propulsion system and the quantitative design variables comprise a taper ratio, a wing twist, and a wing structure;
analyze structural performance, aerodynamic performance, and battery performance of the input aircraft model utilizing an iterative performance design algorithm by:
based on the input set of quantitative design variables including the taper ratio, the wing twist, and the wing structure,
iteratively modifying the ailerons based on a steady roll-state,
iteratively modifying the empennage or the winglet by, for each iteration, iteratively modifying a wing position a horizontal tail area size of the empennage based on a pitching moment coefficient to determine pitching moment coefficients for values of angle of attack, and
iteratively modifying the propulsion system of the input aircraft model based on propulsion criteria
until a balancing metric of the input aircraft model converges, wherein the balancing metric of the input aircraft model comprises one or more of: a center of gravity of the input aircraft model or a weight of a battery of the input aircraft model for powering the propulsion system;
in response to the balancing metric of the input aircraft model converging, determining stresses and deflections of the input aircraft model with the modified ailerons, the modified empennage or the modified winglet, and the modified propulsion system under performance loads; and
upon determining the stresses and deflections, determining a battery performance metric of the input aircraft model with the modified ailerons and the modified propulsion system in relation to a test mission; and
upon determining the battery performance metric, modifying the input set of quantitative design variables comprising the taper ratio, the wing twist, and the wing structure by jointly applying an optimization algorithm to the pitching moment coefficients for values of angle of attack, the stresses and deflections of the input aircraft model, and the battery performance metric to generate a modified aircraft model.

11. The non-transitory computer-readable medium of claim 10, wherein utilizing the iterative performance design algorithm further comprises determining a measure of aeroelastic stability of the input aircraft model with the modified ailerons and the modified propulsion system through a flight envelope by modeling damping of the input aircraft model with respect to an oscillation instability mode.

12. The non-transitory computer-readable medium of claim 11, further comprising instructions that, when executed by the at least one processor, cause the computer system to generate the modified aircraft model by:
utilizing the optimization algorithm to modify the quantitative design variables comprising the taper ratio, the wing twist, and the wing structure according to one or more objectives and one or more constraints based on:
the determined stresses and deflections of the input aircraft model,
the determined battery performance metric of the input aircraft model, and
the determined measure of aeroelastic stability of the input aircraft model,
wherein the one or more objectives comprise reducing aircraft weight and wherein the one or more constraints comprise an aeroelastic stability constraint.

13. The non-transitory computer-readable medium of claim 12, wherein the input aircraft model is a flying-wing aircraft model and further comprising instructions that, when executed by the at least one processor, cause the computer system to:
provide a measure of longitudinal stability as input to the optimization algorithm; and
wherein the one or more constraints of the optimization algorithm comprise a longitudinal stability constraint.

14. The non-transitory computer-readable medium of claim 10, wherein:
the input aircraft model is a flying-wing aircraft model; and
the input set of quantitative design variables further comprises a wing sweep.

15. The non-transitory computer-readable medium of claim 13,
wherein the flying-wing aircraft model further comprises the winglet and a battery having a battery position; and
further comprising instructions that, when executed by the at least one processor, iteratively modify the ailerons with the winglet, the battery position, and the propulsion system of the input aircraft model until the balancing metric of the input aircraft model converges.

16. A system comprising:
at least one processor; and
at least one non-transitory computer readable storage medium storing instructions that, when executed by the at least one processor, cause the system to:
identify an input set of quantitative design variables of an input aircraft model, wherein the input aircraft model comprises ailerons, an empennage, and a propulsion system and the quantitative design variables comprise a taper ratio, a wing twist, and a wing structure;
analyze structural performance, aerodynamic performance, and battery performance of the input aircraft model utilizing an iterative performance design algorithm by:
based on the input set of quantitative design variables including the taper ratio, the wing twist, and the wing structure,
iteratively modifying the ailerons based on a steady roll-state,
iteratively modifying the empennage by, for each iteration, iteratively modifying a wing position and horizontal tail area size of the empennage based on a pitching moment coefficient to determine pitching moment coefficients for values of angle of attack, and
iteratively modifying the propulsion system of the input aircraft model based on propulsion criteria
until a balancing metric of the input aircraft model converges, wherein the balancing metric of the input aircraft model comprises one or more of: a center of gravity of the input aircraft model or a weight of a battery of the input aircraft model for powering the propulsion system;
in response to the balancing metric of the input aircraft model converging, determining stresses and deflections of the input aircraft model with the modified ailerons, the modified empennage, and the modified propulsion system under performance loads; and
upon determining the stresses and deflections, determining a battery performance metric of the input aircraft model with the modified ailerons and the modified propulsion system in relation to a test mission; and
upon determining the battery performance metric, modifying the input set of quantitative design variables comprising the taper ratio, the wing twist, and the wing structure by jointly applying an optimization algorithm to the pitching moment coefficients for values of angle of attack, the stresses and deflections of the input aircraft model, and the battery performance metric to generate a modified aircraft model.

17. The system of claim 16, wherein utilizing the iterative performance design algorithm further comprises determining a measure of aeroelastic stability of the input aircraft model with the modified ailerons and the modified propulsion system through a flight envelope by modeling damping of the input aircraft model with respect to an oscillation instability mode.

18. The system of claim 17, further comprising instructions that, when executed by the at least one processor, cause the system to generate the modified aircraft model by:
utilizing the optimization algorithm to modify the quantitative design variables comprising the taper ratio, the wing twist, and the wing structure according to one or more objectives and one or more constraints based on:
the determined stresses and deflections of the input aircraft model,
the determined battery performance metric of the input aircraft model, and
the determined measure of aeroelastic stability of the input aircraft model,
wherein the one or more objectives comprise reducing aircraft weight and wherein the one or more constraints comprise an aeroelastic stability constraint.

19. The system of claim 18, further comprising instructions that, when executed by the at least one processor, cause the system to, based on the modified input set of quantitative design variables of the modified aircraft model,
iteratively revise the modified ailerons based on the steady roll-state,
iteratively revise the modified empennage by, for each revision, iteratively revising the wing position and horizontal tail area size of the empennage based on a picturing moment coefficient to determine additional pitching moment coefficients for values of angle of attack, and
iteratively revise the modified propulsion system based on the propulsion criteria
until a revised balancing metric of the modified aircraft model converges.

20. The system of claim 16, wherein utilizing the iterative perform design algorithm further comprises, upon determining the modified ailerons and the modified propulsion system:
determining a measure of longitudinal stability based on the modified propulsion system; and
determining a measure of aeroelastic stability utilizing an oscillation instability mode.

* * * * *